United States Patent [19]

Kwoh et al.

[11] Patent Number: 5,724,203

[45] Date of Patent: Mar. 3, 1998

[54] METHOD AND APPARATUS FOR DETERMINING ADDRESSES IN TIME ALONG A RECORDING TAPE

[75] Inventors: Daniel S. Kwoh, La Canada, Calif.; Yee Kong Ng, Tai Po, Hong Kong

[73] Assignee: Index Systems, Inc., Virgin Islands (Br.)

[21] Appl. No.: 736,789

[22] Filed: Oct. 25, 1996

Related U.S. Application Data

[63] Continuation of Ser. No. 504,216, Jul. 19, 1995, abandoned, which is a continuation of Ser. No. 167,285, Dec. 15, 1993, abandoned, which is a continuation-in-part of Ser. No. 66,666, May 27, 1993, abandoned, which is a continuation-in-part of Ser. No. 14,541, Feb. 8, 1993, abandoned, which is a continuation-in-part of Ser. No. 1,125, Jan. 5, 1993, abandoned, which is a continuation-in-part of Ser. No. 883,607, May 7, 1992, abandoned, which is a continuation-in-part of Ser. No. 817,723, Jan. 7, 1992, abandoned, which is a continuation-in-part of Ser. No. 805,844, Dec. 5, 1991, abandoned, which is a continuation-in-part of Ser. No. 747,127, Aug. 19, 1991, abandoned.

[51] Int. Cl.$^6$ .................................................. G11B 15/18
[52] U.S. Cl. .................................. 360/72.3; 242/334.5
[58] Field of Search .......................... 360/72.3, 74.2, 360/72.1, 71; 242/334.5

[56] References Cited

U.S. PATENT DOCUMENTS

| | | | |
|---|---|---|---|
| Re. 30,939 | 5/1982 | d'Alayer et al. | 318/7 |
| 3,672,604 | 6/1972 | Beaumont | 242/344 |
| 3,678,215 | 7/1972 | Kihara | 360/93 |
| 3,701,860 | 10/1972 | Iwawaki et al. | |
| 3,705,699 | 12/1972 | Siller | 242/344 |
| 3,723,666 | 3/1973 | Ferrari | 360/72.1 |
| 3,734,052 | 5/1973 | Feldman | 242/342 |
| 3,839,736 | 10/1974 | Hoshall | 360/132 |
| 3,921,220 | 11/1975 | Primosch et al. | 360/72.3 |
| 4,001,552 | 1/1977 | Muller | 377/24 |
| 4,030,338 | 6/1977 | Ebihara | 73/6 |
| 4,151,403 | 4/1979 | Woolston | 364/562 |
| 4,151,566 | 4/1979 | Ohrman | 360/72.1 |
| 4,172,231 | 10/1979 | d'Alayer de Costemore d'Arc et al. | 360/72.3 X |
| 4,225,890 | 9/1980 | Takenaka et al. | 360/72.1 |
| 4,232,371 | 11/1980 | Kamoto | 364/561 |
| 4,280,159 | 7/1981 | Nakayama | 360/137 |
| 4,347,538 | 8/1982 | Klank | 360/137 |
| 4,363,048 | 12/1982 | Tanaka et al. | 360/137 |
| 4,366,371 | 12/1982 | d'Alayer et al. | 377/18 |
| 4,381,089 | 4/1983 | Kondo | 242/334.3 |
| 4,398,300 | 8/1983 | d'Alayer et al. | 377/18 |
| 4,411,008 | 10/1983 | d'Alayer et al. | 377/18 |
| 4,473,853 | 9/1984 | Corkery | 360/72.2 |
| 4,638,394 | 1/1987 | Hayakawa | 360/72.3 X |
| 4,644,436 | 2/1987 | Unno | 360/72.3 X |
| 4,692,819 | 9/1987 | Steele | 360/72.1 |

(List continued on next page.)

*Primary Examiner*—Andrew L. Sniezek
*Attorney, Agent, or Firm*—Christie, Parker & Hale, LLP

[57] ABSTRACT

Apparatus and methods are provided for measuring an address in time between the beginning of the tape on the reel and the current location along a recording tape wound around a hub of a reel. A method for measuring an address in time between the beginning of the tape on the reel and the current location along a recording tape wound around a hub of a reel comprises the steps of measuring a single rotational period of the reel near a first location along the recording tape being represented as Tp, storing a single rotational period of the reel when the radius of the tape on the reel is approximately the same as the radius of the reel hub being represented as To, storing a differential period between one rotational period of the reel and the next rotational period of the reel as the recording tape is wound around or unwound from the reel being represented as dT, and deriving from Tp, To and dT, an address in time from the beginning of the tape to the first location on the tape by calculating a value Tc corresponding to Tc=(Tp$\hat{0}$2–To$\hat{0}$2)/(2 * dT). A method is also provided for measuring a start address for a program recorded on a recording tape wound around a hub of a reel as the program is recorded by measuring a single rotational period of the supply reel near a start of the recording of the program.

12 Claims, 22 Drawing Sheets

U.S. PATENT DOCUMENTS

| | | | |
|---|---|---|---|
| 4,696,440 | 9/1987 | Hariyaga et al. | 242/357 |
| 4,703,465 | 10/1987 | Parker | 369/30 |
| 4,803,551 | 2/1989 | Park | 348/468 |
| 4,805,053 | 2/1989 | Yamanaka | 360/72.3 |
| 4,894,789 | 1/1990 | Yee | 348/552 |
| 4,908,707 | 3/1990 | Kinghorn | 348/460 |
| 4,977,455 | 12/1990 | Young | 348/460 |
| 4,996,611 | 2/1991 | Ito | 360/72.3 |
| 5,010,499 | 4/1991 | Yee | 348/552 |
| 5,063,610 | 11/1991 | Alwadish | 455/45 |
| 5,119,507 | 6/1992 | Mankovitz | 455/154.1 |
| 5,121,476 | 6/1992 | Yee | 395/154 |
| 5,148,403 | 9/1992 | Gardner | 360/15 |
| 5,179,479 | 1/1993 | Ahn | 360/72.3 X |
| 5,195,000 | 3/1993 | Suzuki | 360/72.3 |

INDEX　　　　　TAPE NO. 8

| TITLE | MIN |
|---|---|
| 1. WHEEL OF FORTUNE | 30 |
| 2. ENTERTAINMENT TONITE | 30 |
| 3. MURPHY BROWN | 30 |
| 4. TERMINATOR | 90 |
| 5. END | 60 |

Fig. 1c

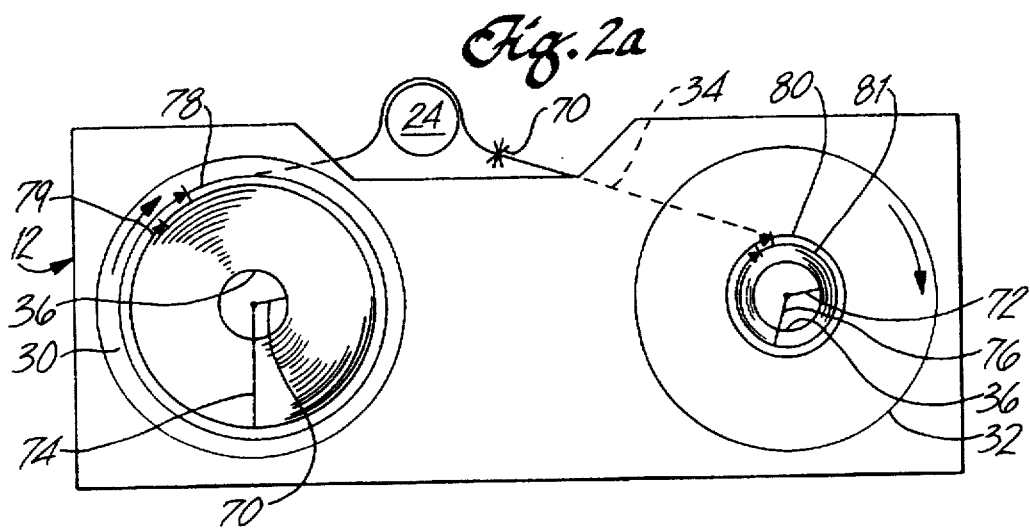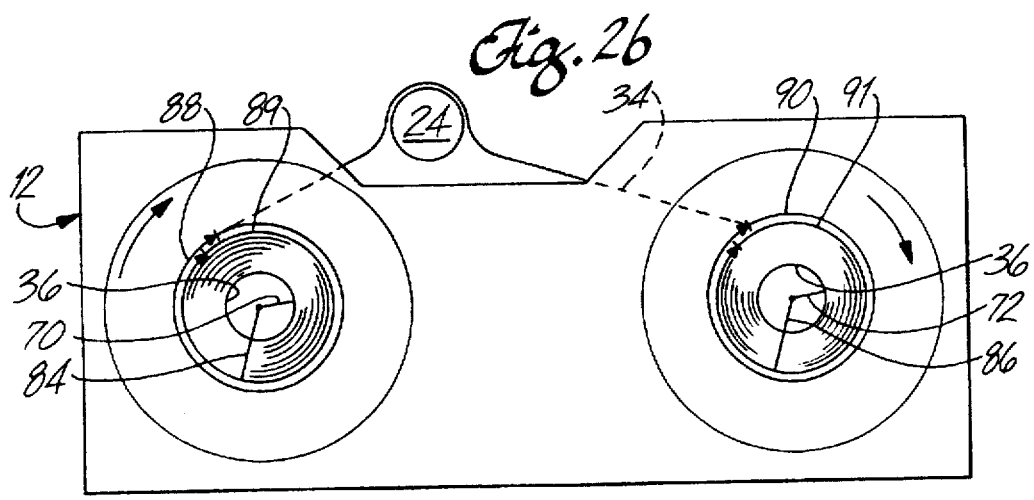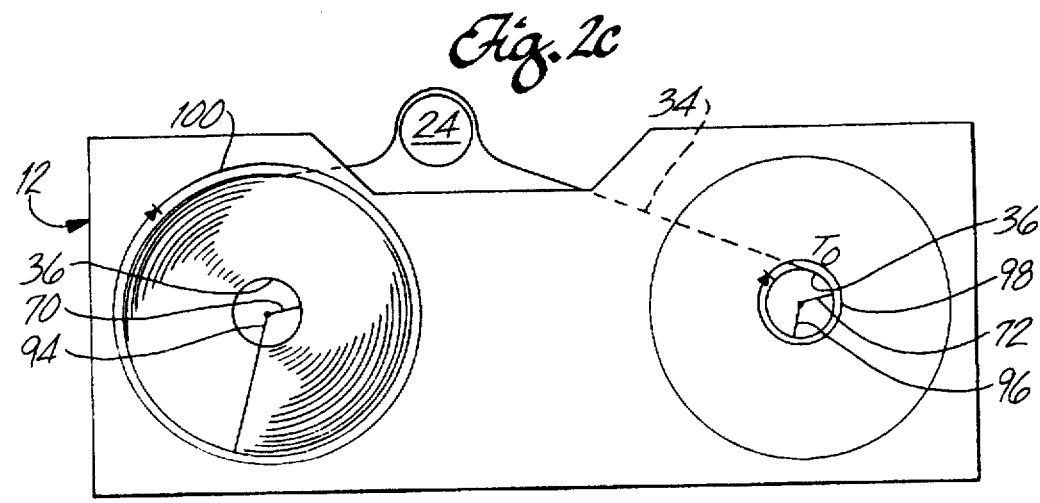

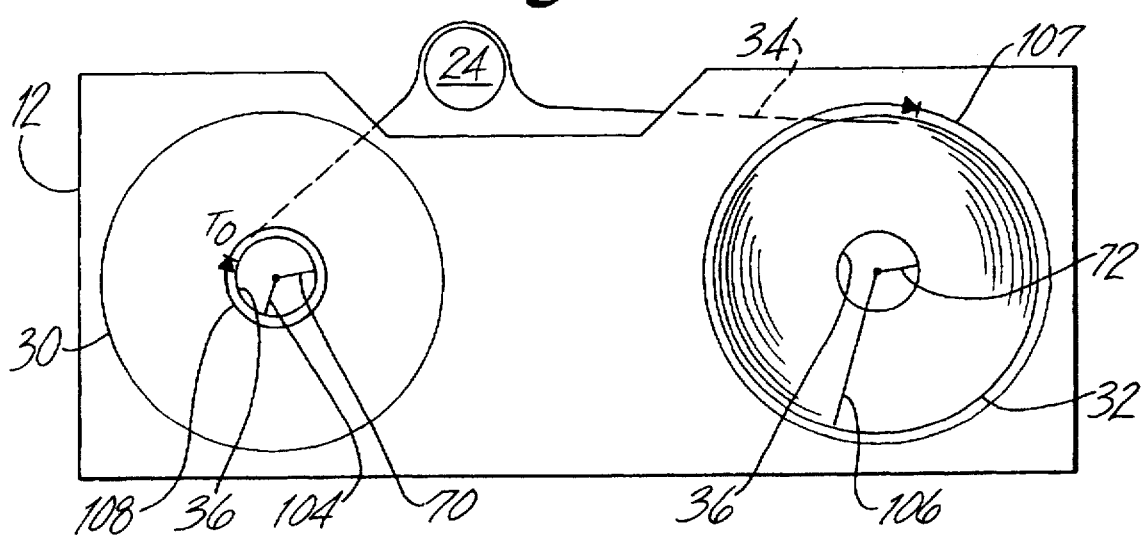

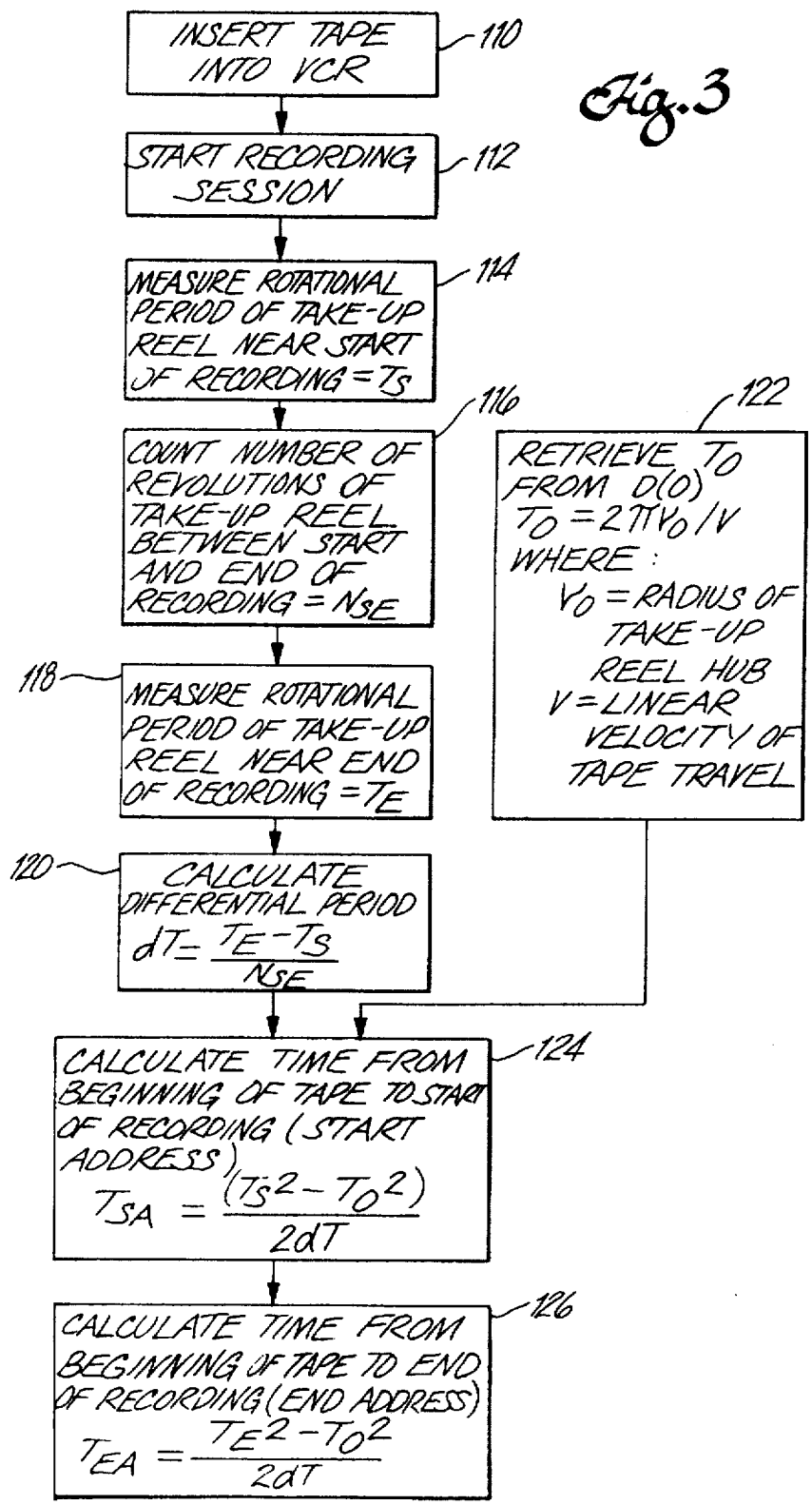

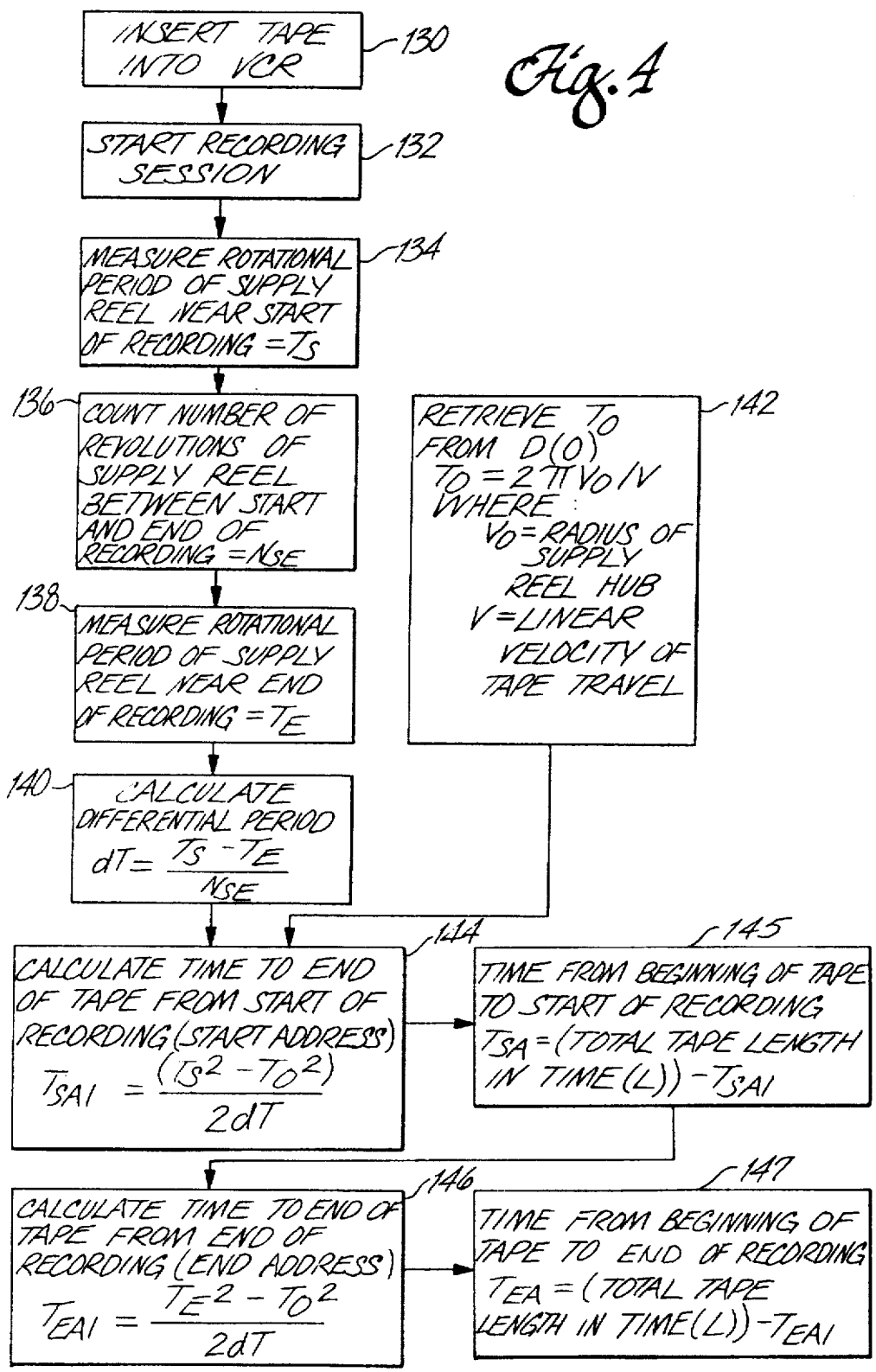

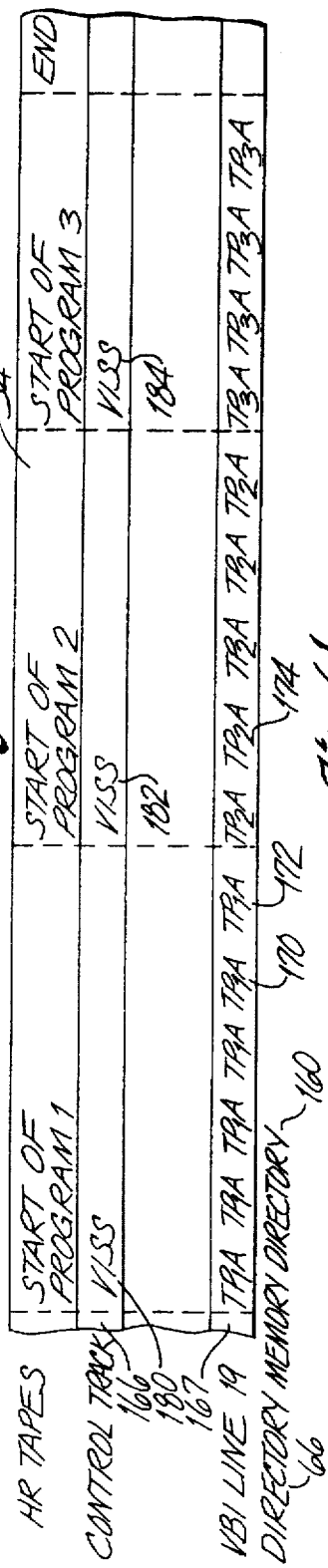
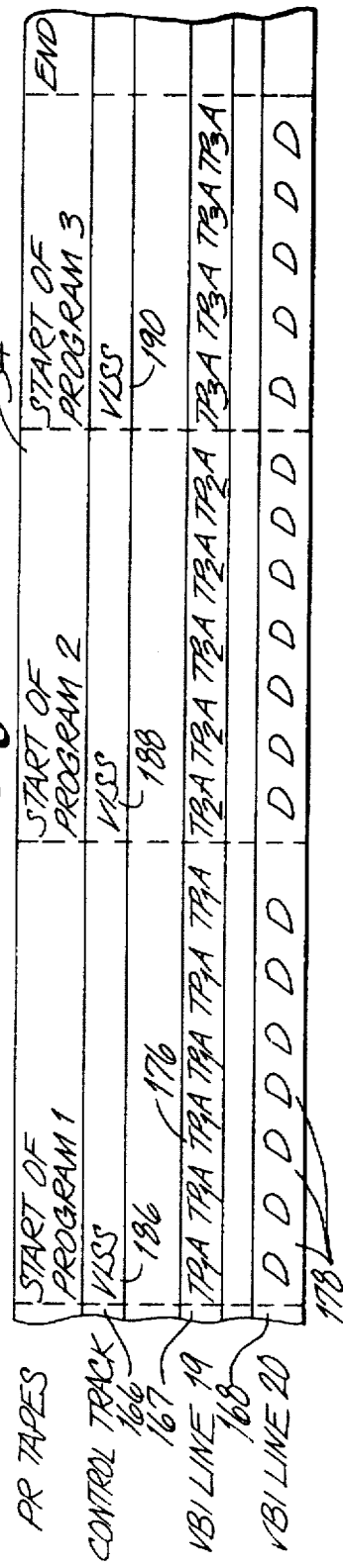
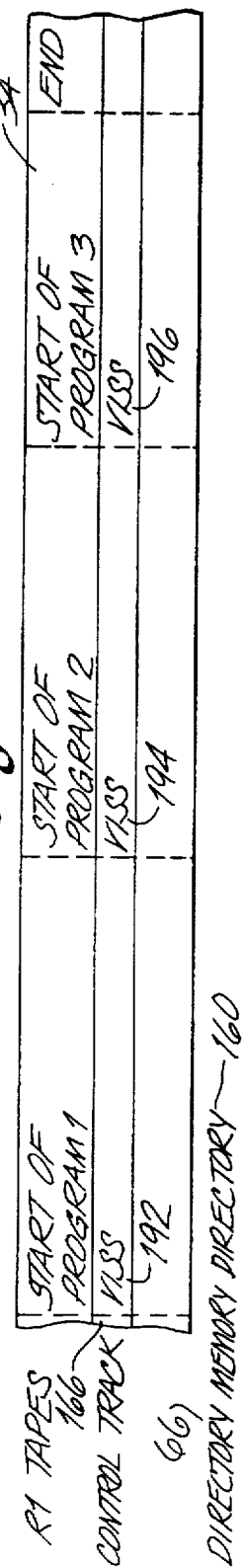

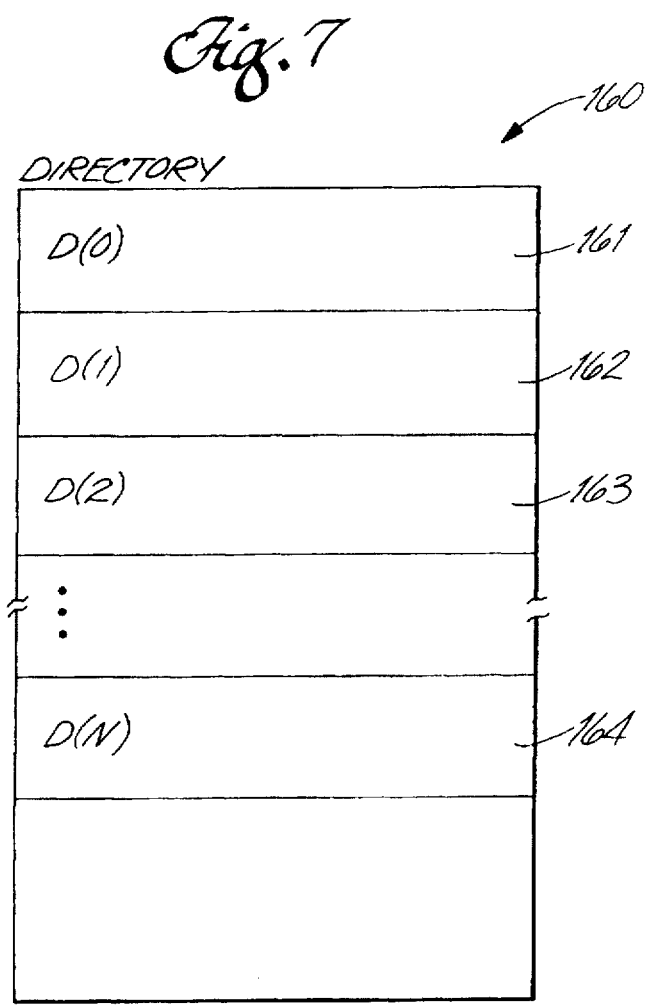

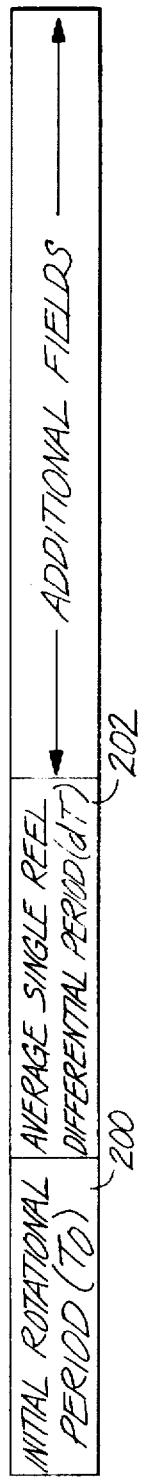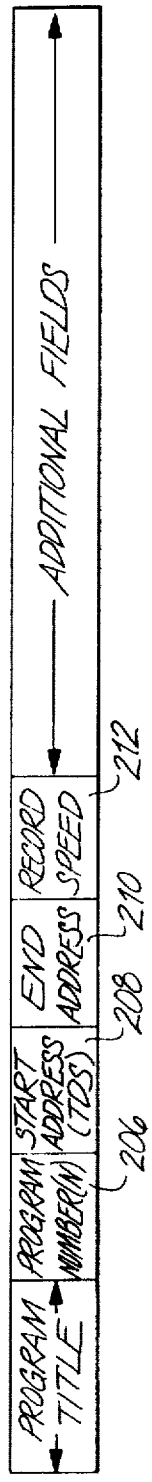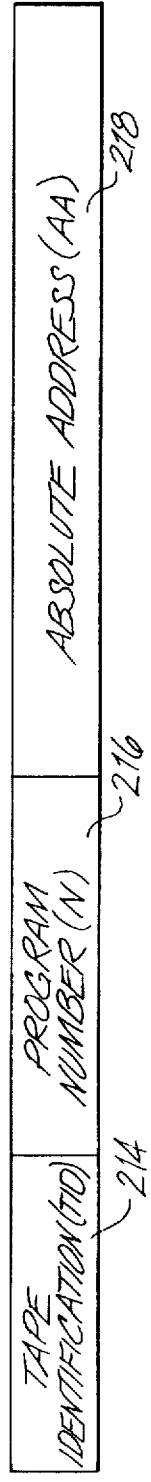

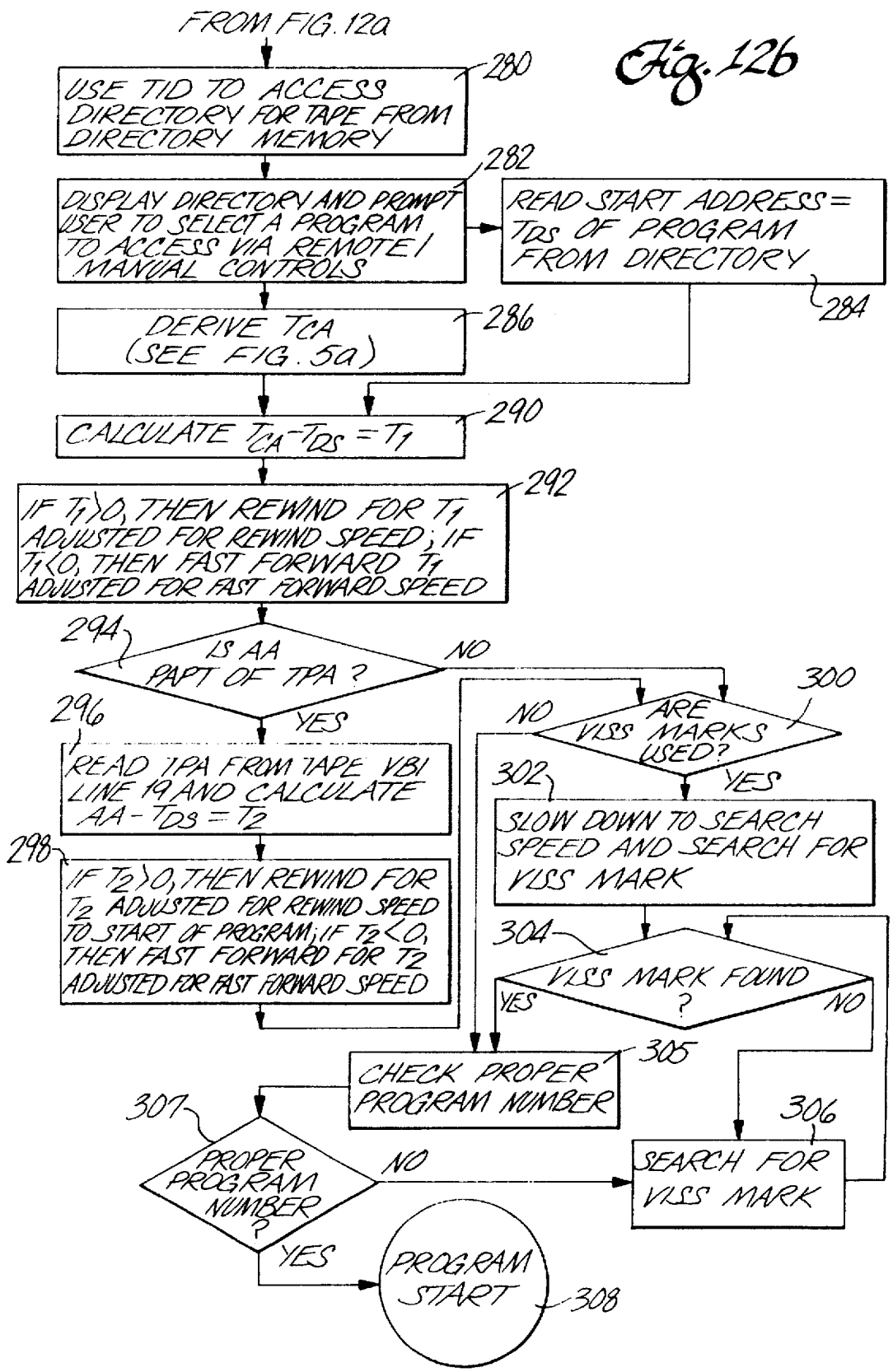

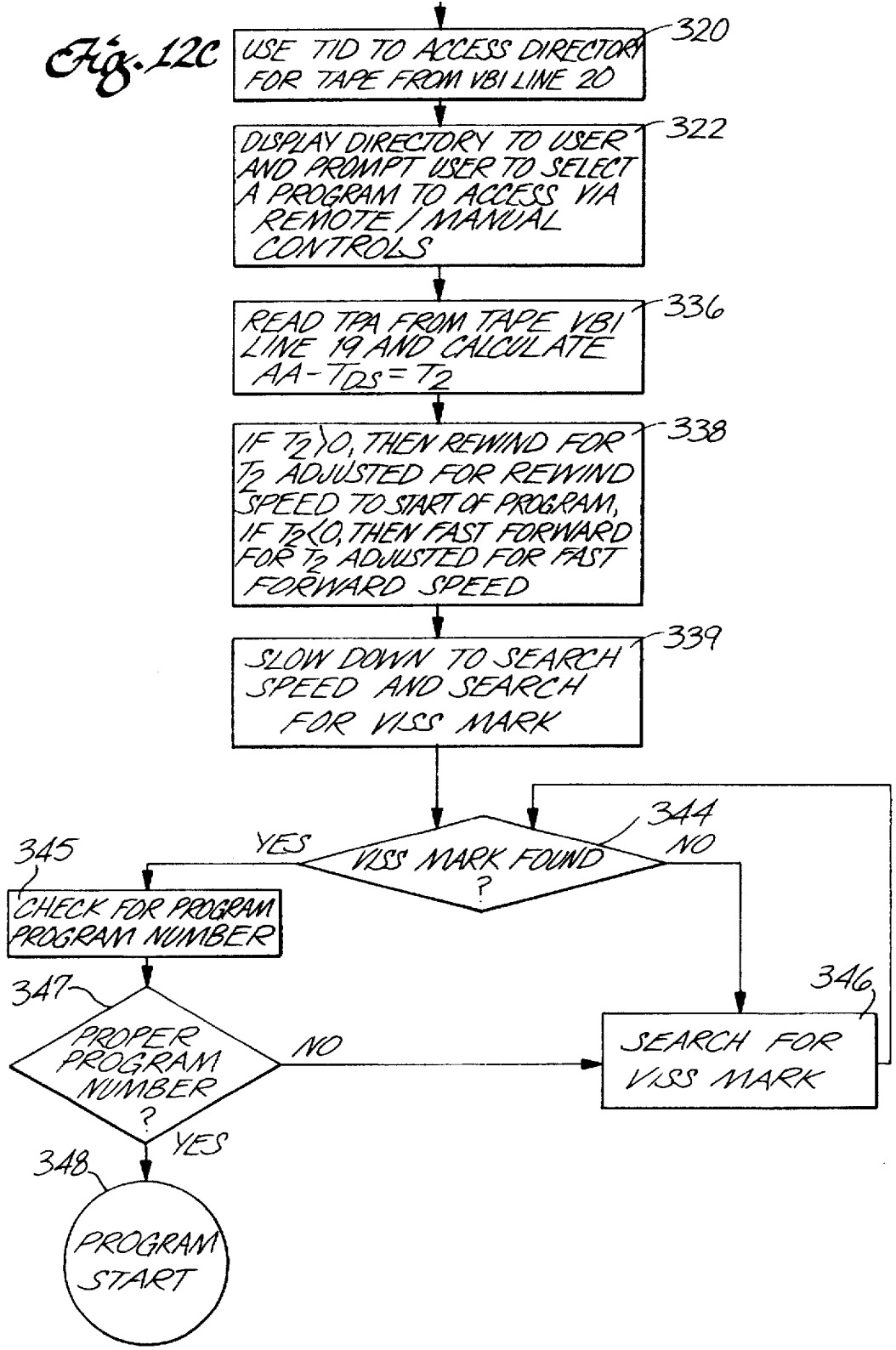

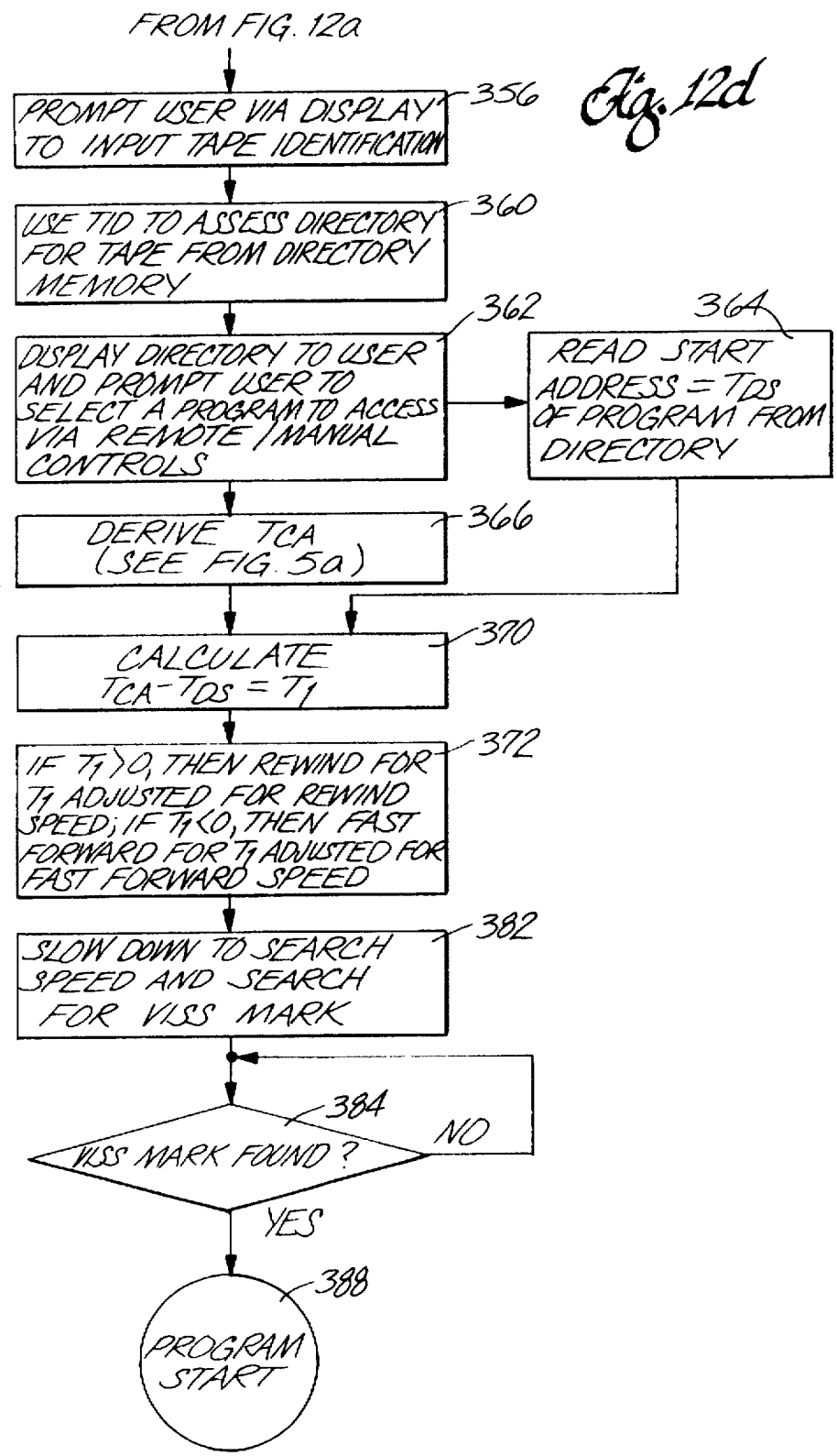

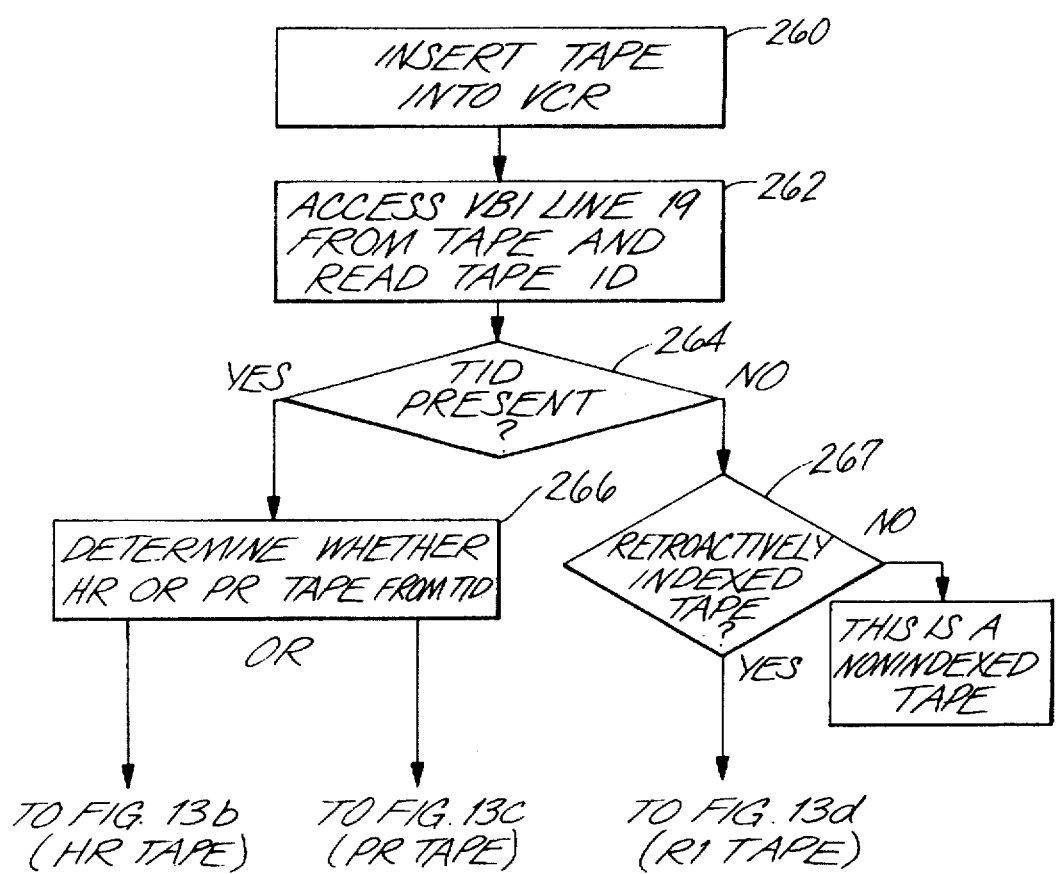

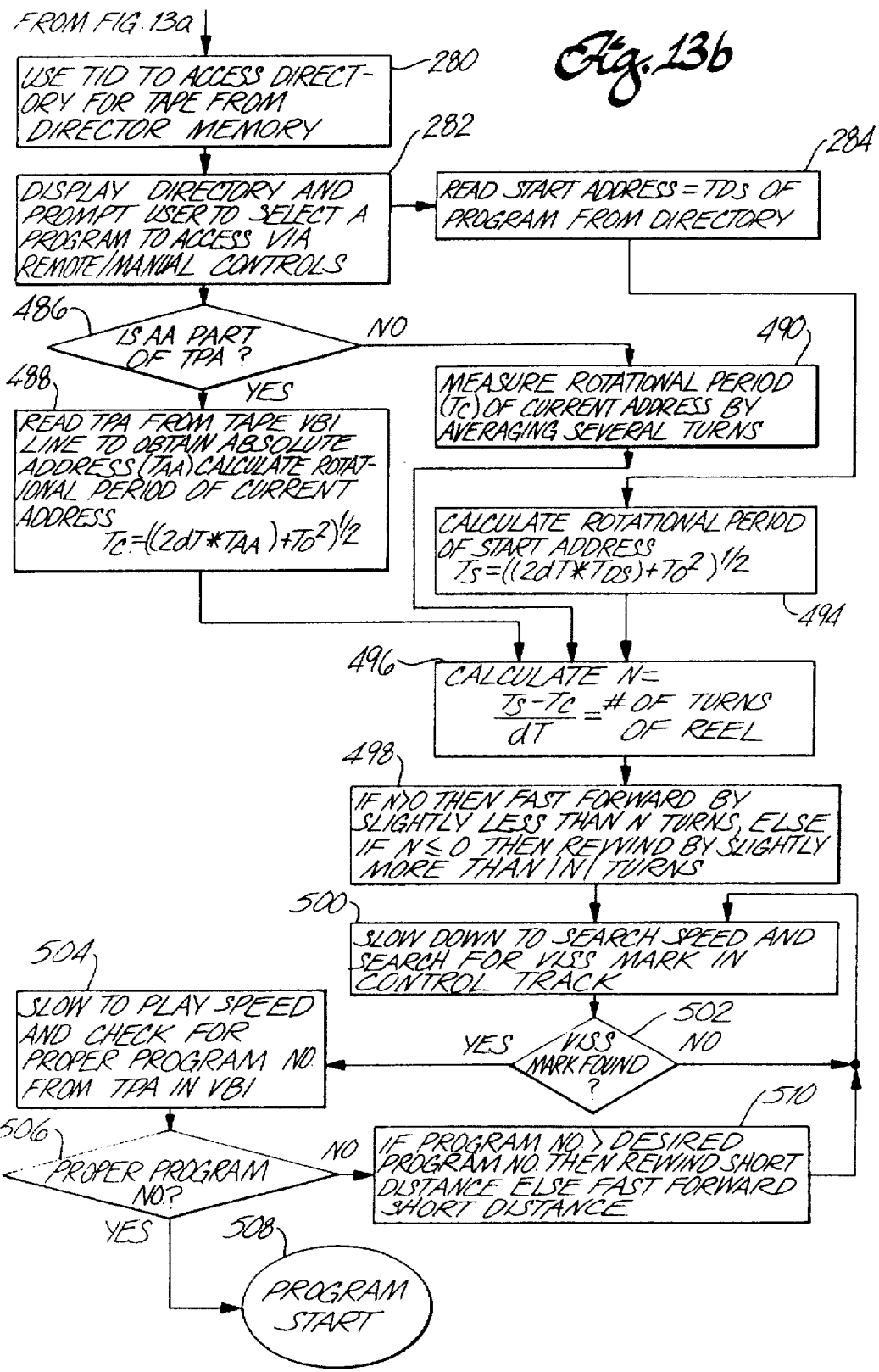

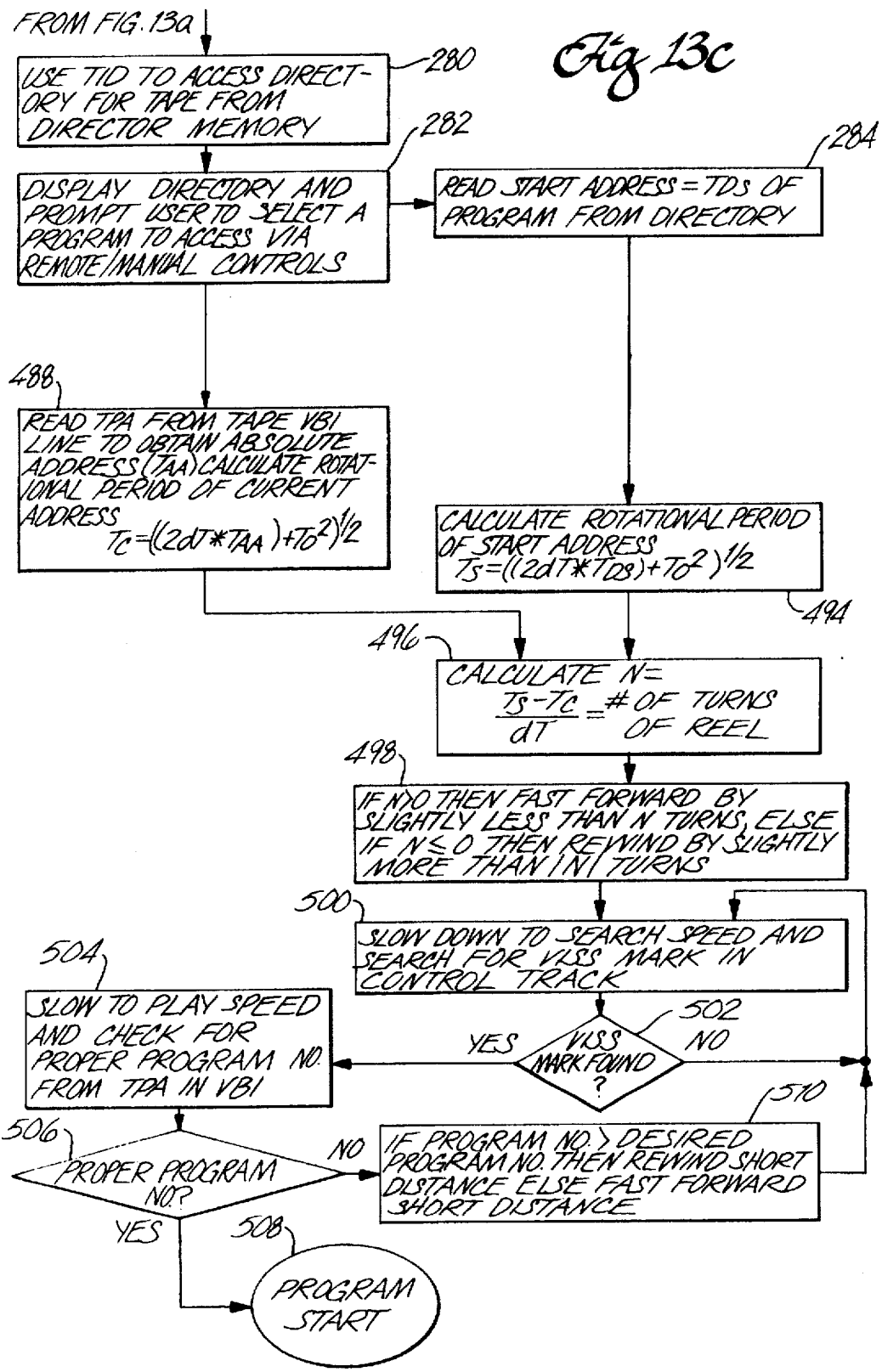

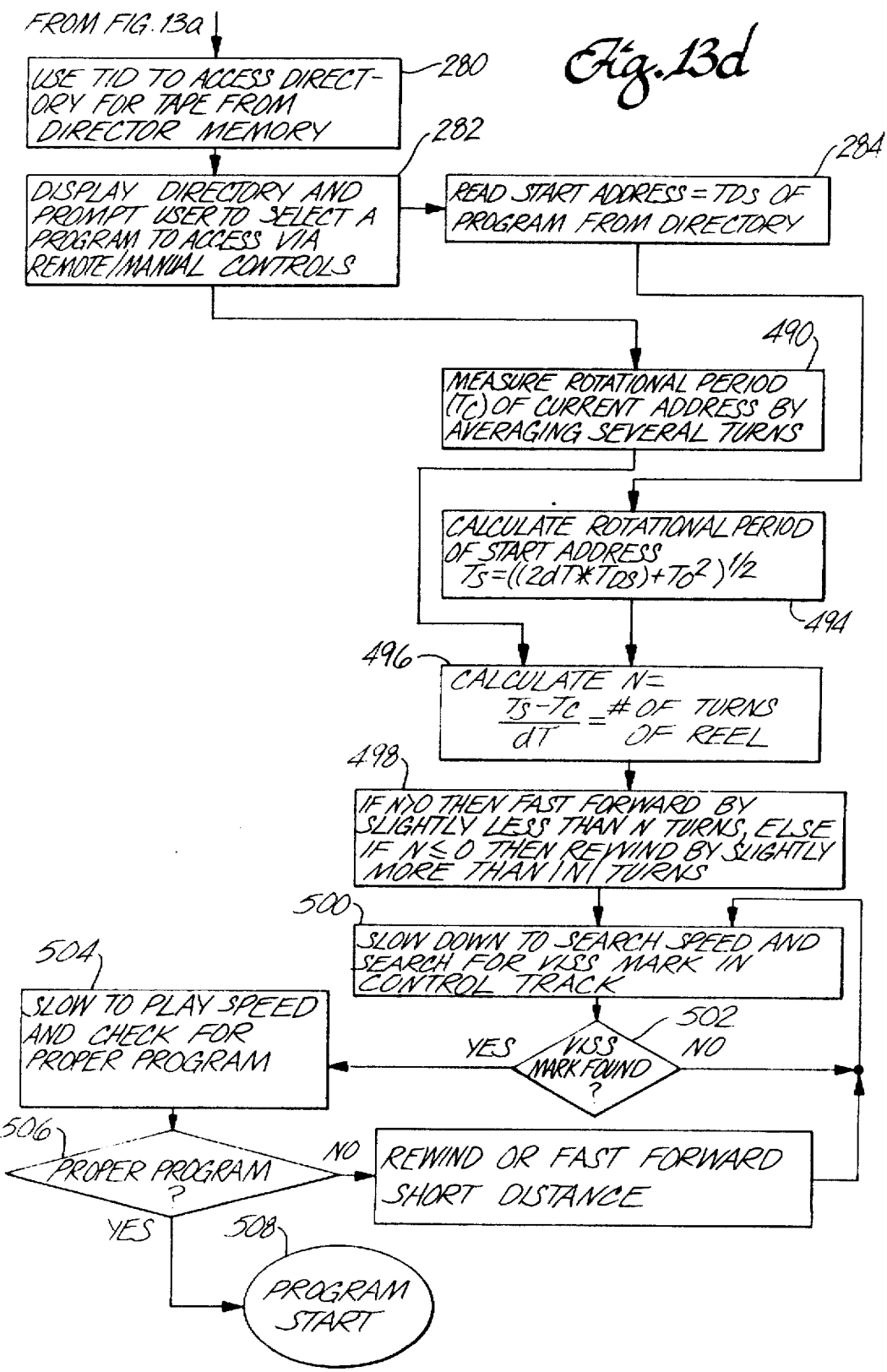

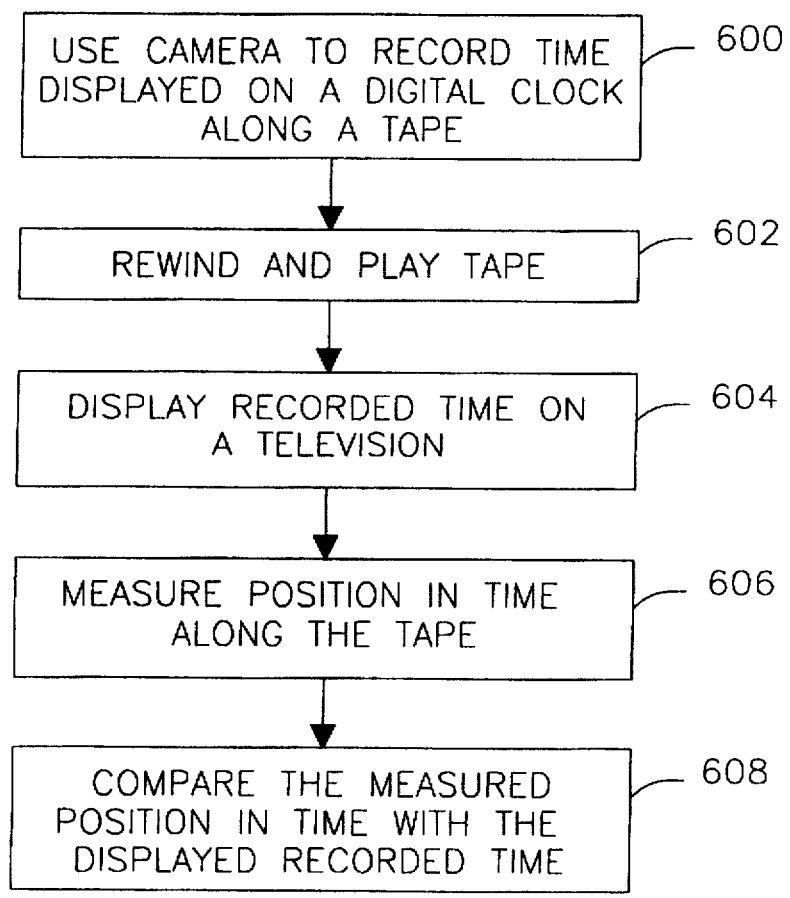

METHOD AND APPARATUS FOR DETERMINING ADDRESSES IN TIME ALONG A RECORDING TAPE

CROSS-REFERENCE TO RELATED APPLICATION

This is a continuation of application Ser. No. 08/504,216, filed Jul. 19, 1995 now abandoned, which is a continuation of application Ser. No. 08/167,285, filed Dec. 15, 1993 now abandoned, which is a continuation-in-part of application Ser. No. 08/066,666, filed May 27, 1993, which is a continuation-in-part of application Ser. No. 08/014,541, filed Feb. 8, 1993, now abandoned, which is a continuation-in-part of application Ser. No. 08/001,125, filed Jan. 5, 1993, now abandoned, which is a continuation-in-part of application Ser. No. 07/883,607, filed May 7, 1992, now abandoned, which is a continuation-in-part of application Ser. No. 07/817,723, filed Jan. 7, 1992, now abandoned, which is a continuation-in-part of application Ser. No. 08/805,844, filed Dec. 5, 1991, now abandoned, which is a continuation-in-part of application Ser. No. 07/747,127, filed Aug. 19, 1991, now abandoned. The subject matter of all of the above referenced patent applications and continuation-in-part applications are incorporated herein by this reference, as though set forth in full.

BACKGROUND OF THE INVENTION

This invention relates to apparatus for addressing information stored on a serial media, such as a magnetic tape. More particularly, the invention relates to a method and apparatus for addressing the location of a program, such as a television program, stored on a magnetic tape.

Two general methods for addressing data are used in the conventional art: random addressing and sequential addressing. The random addressing method is used for various mass storage media, including long playing (LP) record players, compact disc (CD) drives and video disc drives for consumer use and hard disc drives, floppy disc drives and optical disc drives for use with computers. Information is randomly addressed in these mass storage devices by moving a movable head directly over the area of the mass storage media that contains the desired information. The random addressing method is also used for addressing semiconductor memory, such as Dynamic Random Access Memory (DRAM) and Static Random Access Memory (SRAM).

The sequential addressing method is used for addressing mass storage devices that can only be accessed sequentially, including: analog audio tapes used for audio cassette drives; video tapes used with video cassette recorders (VCRs); digital audio tapes; digital tape drives and tape backup cassette drives for use with computers; and analog tape drives for instrumentation purposes. All of these devices use magnetic tape as the storage media. The advantage of magnetic tape is that it has very low storage cost compared with the storage cost of random access devices with movable heads and especially low cost compared to semiconductor memory. The disadvantages and problems of using magnetic tape are three-fold.

First, to go to a particular location on a tape, the tape must be either advanced or rewound in a serial or sequential manner. Unless forward or reverse operations can be performed at very high speed, this can be a time consuming process.

Second, the exact contents and location of records on the tape are not known. Random access devices, such as a disc drive, can record an index of the device contents at the beginning of the disc and anytime the index information needs to be accessed, the read or write head simply skips over to read the index. For magnetic tape, even if the index is recorded in a reserved area at the beginning of the tape, as is presently done in some video tape or computer tape backup systems, its usefulness is limited, due to the time required to rewind the tape all the way to the beginning, assuming the tape is not at the beginning when the need arises to search for the index.

Third, the absolute current location of the tape is not known. Most tape drives have tape counters which only indicate relative location. For example, if a tape cassette is played and then removed from a tape drive without rewinding, the next time the cassette is inserted and played by a tape drive, the absolute location of the tape in the cassette will no longer be known. Attempts have been made to overcome this problem by writing absolute address marks onto the tape. For example, some recent video tapes use the VHS Address Search System (VASS) whereby absolute address marks are written at 1 minute intervals onto the control track of a VHS tape. Another technique in the conventional art is to use a Video Index Search System (VISS), which can be used to place a mark on the control track of the tape. For example, a VISS mark can be placed at the beginning of each program; however, this technique alone does not provide a user information on how to access a program from a number of programs on a tape.

Another addressing application is for tapes used to back up computer hard discs. A streaming mode is usually used and a constant stream of data blocks (usually 512 bytes) are written onto the tape, each block being usually preceded by one or two address bytes. This provides some addressing, but the addressing resolution decreases as the block size increases.

Knowing the absolute address on a tape is important. For example, assume that there are 5 programs or records on a tape and each of their starting addresses is known and a user desires to go to the starting location of program 4. Without knowing the absolute address of where the tape is currently positioned, the user or the drive has no way of knowing whether to rewind or fast forward the tape to reach the desired record.

In order for tape drives to compete against random access devices it is important that these problems be either overcome or ameliorated. There are a large number of users of video cassette recorders with video cassette tapes, which are not likely to be replaced by a random access media in the near future. So, providing a method of finding the absolute address on a video cassette tape would solve a long standing problem in the art.

In the conventional art, there are methods for determining the location on a magnetic tape. U.S. Pat. No. 3,921,220 issued Nov. 8, 1975 to Primosch is for a reel to reel magnetic tape transport and senses the actual magnetic tape position by either counting rotations of one tape reel or by comparing the number of rotations of one tape reel with the number of rotations of a tape drive capstan mechanism. This method has limited accuracy.

A U.S. Patent to d'Alayer de Costemore d'Arc et al., Re. No. 30,939 reissued May 18, 1982, which is a reissue of U.S. Pat. No. 4,172,231 issued Oct. 23, 1979, determines the magnetic tape position by using the ratio of the rotational speeds of the two reels of a reel to reel tape transport. The ratio of the speeds continuously changes as the tape is transferred from one reel to the other reel. This method is also not as accurate as desired.

3

Accordingly, there is a need in the art for an addressing system that provides a fast and accurate way of searching for the starting points of programs stored on a magnetic tape and providing random access for a serial media at a much lower cost than random access media using movable heads or semiconductor memory. There is also a need in the art for an addressing system that determines the current position on a magnetic tape and provides a means of homing into the destination address, during a search. The art also needs a system for determining the end address and lengths of programs as they are recorded.

SUMMARY OF THE INVENTION

According to the present invention, methods and apparatus are provided for determining addresses in time along a recording tape.

In an embodiment of the present invention, an apparatus for determining an address in time between a beginning of a tape on a reel and a current location along a recording tape wound around a hub of a reel includes a means for determining a single rotational period of the reel near a first location along the recording tape being represented as Tp. A single rotational period of the reel is determined when the radius of the tape on the reel is approximately the same as the radius of the reel hub being represented as To and stored. Also, a differential period between one rotational period of the reel and the next rotational period of the reel as the recording tape is wound around or unwound from the reel being represented as dT is determined and stored. A means is included for deriving from Tp, To and dT, an address in time from the beginning of the tape to the first location on the tape.

In a specific embodiment the means for deriving from Tp, To and dT, an address in time from the beginning of the tape to the first location on the tape represented as Tc comprises a processor means for obtaining a value Tc corresponding to the equation $Tc=(Tp^2-To^2)/(2 * dT)$.

Another embodiment of the present invention includes a method for determining an address in time between the beginning of the tape on the reel and the current location along a recording tape wound around a hub of a reel and includes the steps of measuring single rotational period of the reel near a first location along the recording tape being represented as Tp. The next step is storing a single rotational period of the reel when the radius of the tape on the reel is approximately the same as the radius of the reel hub being represented as To is stored. Another step is storing a differential period between one rotational period of the reel and the next rotational period of the reel as the recording tape is wound around or unwound from the reel being represented as dT. Finally, from Tp, To and dT, an address in time from the beginning of the tape to the first location on the tape is derived.

In a specific embodiment, the method for deriving from Tp, To and dT, an address in time from the beginning of the tape to the first location on the tape comprises the step of calculating a value Tc corresponding to $Tc=(Tp^2-To^2)/(2 * dT)$.

In yet another embodiment of the present invention, an apparatus is provided for determining a start address for a program recorded on a recording tape wound around a hub of a take-up reel as the program is recorded. The apparatus includes means for determining a single rotational period of the take-up reel near a start of the recording of the program being represented as Ts, means for counting the number of revolutions of the take-up reel between the start and an end

4 of the recording, the number of revolutions being represented as N, means for determining a single rotational period of the take-up reel near the end of the recording of the program being represented as Te, means for determining a differential period between one rotational period of the take-up reel and the next rotational period of the take-up reel as the recording tape is wound around or unwound from the take-up reel being represented as dT by using Ts, N and Te, means for storing a single rotational period of the reel when the radius of the tape on the reel is approximately the same as the radius of the reel hub being represented as To, and means for deriving from Ts, N, Te, and To, the start address being represented by Tsa as the time between the beginning of the tape on the take-up reel and the start of recording of the program recorded along the recording tape.

In a specific embodiment, the means for determining a single rotational period of the take-up reel near a start or end of the recording of the program being represented as Ts additionally comprises a means for generating pulses as the take-up reel rotates, a rotational period counter means coupled to the means for generating pulses for measuring of a rotation and a clock coupled to the rotational period counter.

In yet another specific embodiment, the means for determining an average differential period between one rotational period of the take-up reel and the next rotational period of the take-up reel as the recording tape is wound around or unwound from the take-up reel, being represented as dT, additionally comprises processor means for obtaining a value dT corresponding to $dT=(Te-Ts)/N$.

In another specific embodiment, the means for deriving from Ts, N, and To, the start address being represented by Tsa as the time between the beginning of the tape on the take-up reel and the start of recording of the program recorded along the recording tape additionally comprises processor means for obtaining a value Tsa corresponding to $Tsa=(Ts^2-To^2)/(2 * dT)$.

In another specific embodiment, the means for deriving from Ts, N, Te, and To, the end address of the program being represented by Tea as the time between the beginning of the tape on the take-up reel and the end of recording of the program recorded along the recording tape additionally comprises processor means for obtaining a value Tea corresponding to $Tea=(Te^2-To^2)/(2 * dT)$.

In another embodiment of the present invention a supply reel is used rather than the take-up reel and Tsa and Tea are derived with apparatus similar to the apparatus used with the take-up reel, except that the means for determining a differential period between one rotational period of the supply reel and the next rotational period of the supply reel as the recording tape is wound around or unwound from the supply reel, being represented as dT, comprises processor means for obtaining a value dT corresponding to $dT=(Ts-Te)/N$ rather than $dT=(Te-Ts)/N$ used for the take-up reel.

In another embodiment of the present invention, a method is provided for determining a start address for a program recorded on a recording tape wound around a hub of a take-up reel as the program is recorded. The method comprises the steps of determining a single rotational period of the take-up reel near a start of the recording of the program being represented as Ts, counting the number of revolutions of the take-up reel between the start and an end of the recording, the number of revolutions being represented as N, determining a single rotational period of the take-up reel near the end of the recording of the program being represented as Te, determining an average differential period between one rotational period of the take-up reel and the next rotational period of the take-up reel as the recording tape is wound around or unwound from the take-up reel being represented as dT by using Ts, N and Te, storing a single rotational period of the reel when the radius of the tape on the reel is approximately the same as the radius of the reel hub being represented as To, and deriving from Ts, N, Te, and To, the start address being represented by Tsa as the time between the beginning of the tape on the take-up reel and the start of recording of the program recorded along the recording tape.

In a specific embodiment, the step of determining a differential period between one rotational period of the take-up reel and the next rotational period of the take-up reel as the recording tape is wound around or unwound from the take-up reel, being represented as dT, additionally comprises the step of obtaining a value dT corresponding to dT=(Te−Ts)/N.

In another embodiment of the present invention, a method is provided for indexing programs being recorded on a recording tape being unwound or wound around a hub of a reel as programs are recorded thereon including the steps of providing a directory memory for storing information concerning recorded programs, determining a single rotational period of the reel near a start of the recording of the program being represented as Ts, counting the number of revolutions of the reel between the start and an end of the recording, the number of revolutions being represented as N, determining a single rotational period of the reel near the end of the recording of the program being represented as Te, determining a differential period between one rotational period of the reel and the next rotational period of the reel as the recording tape is wound around or unwound from the reel being represented as dT by using Ts, N and Te to obtain a value dT corresponding to dT=(Ts−Te)/N if Ts>=Te, or dT=(Te−Ts)/N if Te<Ts, storing a single rotational period of the reel when the radius of the tape on the reel is approximately the same as the radius of the reel hub being represented as To, deriving from Ts, N, and To, the start address being represented by Tsa as the time between the beginning of the tape on the reel and the start of recording of the program recorded along the recording tape by obtaining a value Tsa corresponding to Tsa=(Ts^2−To^2)/(2 * dT), and storing the value of Tsa for the program in a directory.

In a specific embodiment, the method additionally comprises for successive locations along the tape as the program is being recorded the steps of determining a single rotational period of the reel being represented as Tp near each successive location along the recording tape, storing a single rotational period of the reel when the radius of the tape on the reel is approximately the same as the radius of the reel hub being represented as To, storing a differential period between one rotational period of the reel and the next rotational period of the reel as the recording tape is wound around or unwound from the reel being represented as dT, and deriving from Tp, To and dT, an address in time from the beginning of the tape to each successive location along the recording tape by calculating a value being represented as Tc according to the equation Tc=(Tp^2−To^2)/(2 * dT), and storing each value Tc in a vertical blanking interval along the recording tape substantially adjacent to the successive location along the tape at which the corresponding single rotational period of the reel being represented as Tp was determined.

In another embodiment of the present invention, a method is provided for retroactively indexing each program recorded on a recording tape wound around a hub of a reel comprising for each program recorded on the tape the steps of providing a directory memory for storing information concerning the program positioning the tape to the start of the program, determining a single rotational period of the reel near a start of the program being represented as Ts, counting the number of revolutions of the reel between the start and an end of the program, the number of revolutions being represented as N, determining a single rotational period of the reel near the end of the program being represented as Te, determining a differential period between one rotational period of the reel and the next rotational period of the reel as the recording tape is wound around or unwound from the reel being represented as dT by using Ts, N and Te to obtain a value dT corresponding to dT=(Ts−Te)/N if Ts>=Te, or dT=(Te−Ts)/N if Te<Ts, storing a single rotational period of the reel when the radius of the tape on the reel is approximately the same as the radius of the reel hub being represented as To, and deriving from Ts, N, and To, the start address being represented by Tsa as the time between the beginning of the tape on the reel and the start of recording of the program recorded along the recording tape by obtaining a value Tsa corresponding to Tsa=(Ts^2−To^2)/(2 * dT), and storing the value of Tsa for the program in the directory memory.

In yet another embodiment of the present invention, a method is provided for accessing a program from an indexed tape wound around a hub of a reel comprising the steps of providing a directory containing for each program a start address being represented by Tsa as the time between the beginning of the tape on the reel and the start of recording of the program recorded along the recording tape, reading the start address Tsa for a program to be accessed from the directory, determining a single rotational period of the reel at a current location along the recording tape being represented as Tc, storing a single rotational period of the reel when the radius of the tape on the reel is approximately the same as the radius of the reel hub being represented as To, storing a differential period between one rotational period of the reel and the next rotational period of the reel as the recording tape is wound around or unwound from the reel being represented as dT, deriving from Tsa, To and dT, a single rotational period of the reel at the start address being represented as $T_S$, calculating the number of reel turns between the current address and the start address corresponding to $N=(T_S-T_C)dT$, and forwarding or rewinding the tape by slightly less or slightly more than N turns, respectively.

In another embodiment a method is provided for accessing a program from a pre-recorded tape wound around a hub of a reel comprising steps using a directory stored directly on the tape and addresses stored directly on the tape.

In a specific embodiment, the method includes the steps of displaying a directory of programs to a user and selecting a program to access.

In another specific embodiment, the method includes the steps of using a cursor to select a program to access from the displayed directory.

In another embodiment a method is provided for testing an accuracy of a technique for locating the position in time along a tape, comprising the steps of recording a displayed time of a digital clock along a tape, playing the tape, displaying the recorded time, measuring the position in time along the tape using the technique for locating the position in time along a tape, and comparing the measured position in time along the tape with the displayed recorded time.

In a specific embodiment the steps of recording a displayed time of a digital clock along a tape and playing the tape additionally comprise the step of using a video cassette recorder.

In another specific embodiment the step of displaying the recorded time additionally comprises the step of using a television coupled to the video cassette recorder.

BRIEF DESCRIPTION OF THE DRAWINGS

The features of specific embodiments of the best mode contemplated of carrying out the invention are illustrated in the drawings, in which:

FIG. 1b is a block diagram of a rotation period counter and revolution counter in accordance with principles of the invention.

FIG. 1c is an illustration of a display of a directory in accordance with principles of the invention.

FIG. 2a is an illustrative diagram showing the amount of tape on each reel of a video cassette tape at the start of a recording session in accordance with principles of the invention.

FIG. 2b is an illustrative diagram showing the amount of tape on each reel of a video cassette tape at the end of a recording session in accordance with principles of the invention.

FIG. 2c is an illustrative diagram showing the amount of tape on each reel of a video cassette tape when the tape is wound on the supply reel in accordance with principles of the invention.

FIG. 2d is an illustrative diagram showing the amount of tape on each reel of a video cassette tape when the tape is wound on the take-up reel in accordance with principles of the invention.

FIG. 3 is a flowchart showing the steps employed in determining the start and end address of a program recorded on a tape in time from the beginning of a tape by measuring the rotational period of the take-up reel in accordance with principles of the invention.

FIG. 4 is a flowchart showing the steps employed in determining the start and end address of a program recorded on a tape in time from the beginning of a tape by measuring the rotational period of the supply reel in accordance with principles of the invention.

FIG. 6a is a schematic view of an embodiment for home recorded tapes illustrating storing VISS marks on a control track and TPA packets each containing a tape identification number, program number, and absolute address on a vertical blanking interval line and using a directory memory in accordance with principles of the invention.

FIG. 6b is a schematic view of an embodiment for pre-recorded tapes illustrating storing VISS marks on a control track, TPA packets each containing a tape identification number, program number, and absolute address on a vertical blanking interval, and a directory on a vertical blanking interval line in accordance with principles of the invention.

FIG. 6c is a schematic view of an embodiment for retroactively indexed tapes illustrating storing VISS marks on a control track and using a directory memory in accordance with principles of the invention.

FIG. 7 is a schematic conceptually illustrating a directory in accordance with principles of the invention.

FIG. 8a is a schematic conceptually illustrating the information in the D(0) portion of FIG. 7 in accordance with principles of the invention.

FIG. 8b is a schematic conceptually illustrating the information in the D(1) to D(N) portion of FIG. 7 in accordance with principles of the invention.

FIG. 9 is a schematic conceptually illustrating the information in the TPA packet in accordance with principles of the invention.

FIGS. 12a through 12d are flowcharts showing the steps employed in using the steps of FIG. 5a for accessing programs recorded on a tape in accordance with principles of the invention. FIG. 12b shows the steps employed in accessing programs recorded on a home recorded tape. FIG. 12c shows the steps employed in accessing programs recorded on a pre-recorded tape. FIG. 12d shows the steps employed in accessing programs recorded on a retroactively indexed tape.

FIG. 13a through 13d are flowcharts showing the steps employed for accessing programs recorded on a tape in accordance with principles of the invention. FIGS. 13b, 13c, and 13d are for accessing programs on home recorded, pre-recorded and retroactively indexed tapes, respectively.

FIG. 14 is a flow diagram of a method for testing the accuracy of a technique for locating a position in time along a tape.

DETAILED DESCRIPTION OF THE SPECIFIC EMBODIMENTS

Figure 1A:
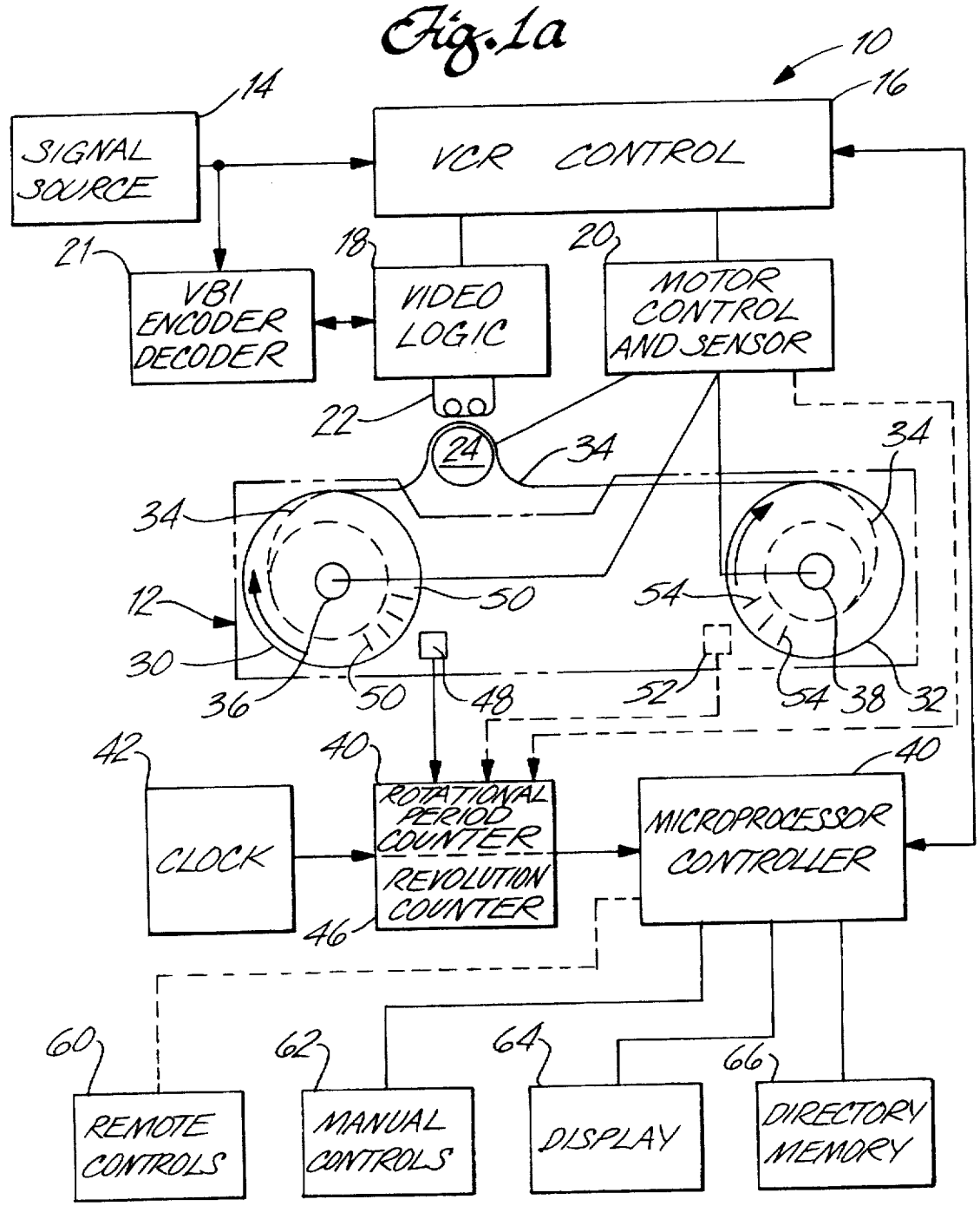
FIG. 1a is a block diagram illustrating a video cassette recorder including apparatus for determining an address in time between the beginning of the tape on the reel and the current location and/or the start of a program recorded along a recording tape wound around a hub of a reel in accordance with principles of the invention.
Figure 16:
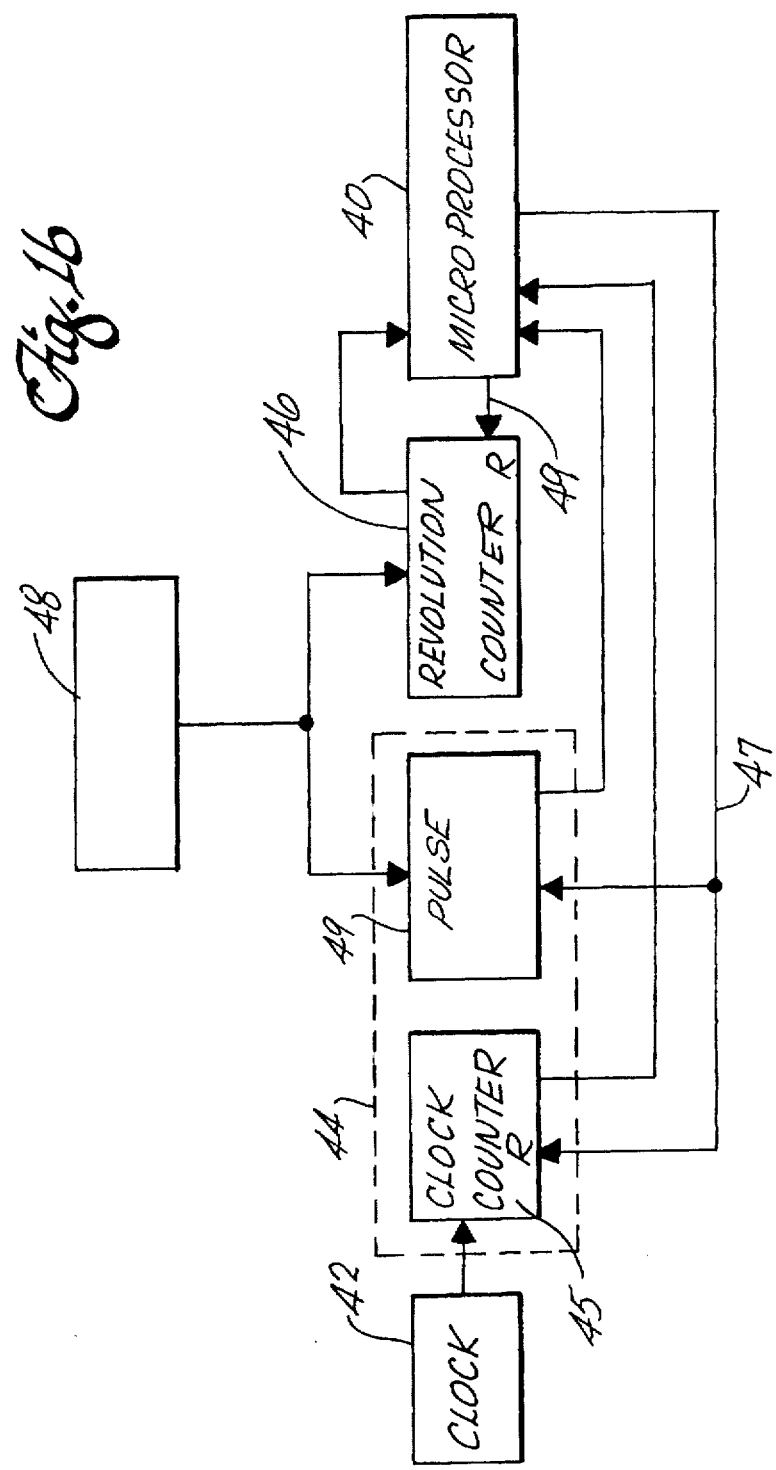

FIG. 1a shows an apparatus for determining an address in time beginning between the beginning of a tape on the reel and the current location on the tape or the start of a program recorded on a recording tape wound around a hub of a reel in accordance with the principles of this invention. The single reel rotational period addressing system 10 includes a magnetic tape cassette 12, which is both written to and read from. The signal source 14 receives signals from a cable or a television broadcast station which are sent to the VCR control logic 16 and can be written onto the magnetic tape cassette 12 via the video logic 18 and the read/write head 22. The VCR control logic 16 also controls the motor control and sensor 20, which operates the winding and unwinding of the reels of the magnetic tape cassette 12 as well as the rotation of capstan 24.

The magnetic tape cassette 12, which can be a video cassette tape, includes a supply reel 30 and a take-up reel 32. The magnetic tape 34 is wound around supply reel 30 and take-up reel 32. During recording onto magnetic tape 34 the tape unwinds from supply reel 30 and is wound onto take-up reel 32. The supply reel 30 has a supply reel hub 36 and the take-up reel 32 has a take-up reel hub 38. As a program is recorded or played, the tape is passed around capstan 24 which is in close proximity to read/write head 22. The capstan 24 is controlled by motor control and sensor 20 to maintain a constant linear tape speed during record and play operations. During rewind and fast forward operations the tape speed is not controlled by the capstan 24 speed but is determined by the supply or take-up reel speeds. Thus, the rewind and fast forward speeds are not controlled as precisely as the play and record speeds. The VCR has another speed called search speed, which is controlled by the capstan 24 and is faster than the play speed.

The VCR control logic 16 is coupled to a microprocessor controller 40, which includes a processor, memory, and input output logic. The microprocessor controller 40 is programmed to execute the flow diagrams of FIGS. 3, 4, 5a–b, 10, 11, and 12a–d. The microprocessor controller is also coupled to a rotation period counter 44 and a revolution counter 46. The purpose of the rotation period counter 44 is to measure the rotation period of a reel on the cassette magnetic tape 12. Either the rotation period of the supply reel 30 or the rotation period of the take-up reel 32 can be measured. To measure the rotational period of supply reel 30, reflected light photo optical detector 48 is located adjacent to supply reel 30. A plurality of reflective lines 50 are located on the supply reel 30. As the supply reel 30 rotates the reflected light photo optical detector 48 senses the rotation via the plurality of reflective lines 50.

In this invention it is only necessary to sense the rotational period and the revolution counts of either the take-up reel or the supply reel. If the take-up reel is used rather than the supply reel then reflected light photo optical detector 52 is used in conjunction with the plurality of reflective lines 54 located on the take-up reel 32.

Instead of measuring the rotation period by sensing the reflective lines on the reels, it is also possible to count pulses, which are sent from motor control and sensor 20. In one embodiment 8 pulses are sent from motor control and sensor 20 to rotation period counter 44 and revolution counter 46 for each rotation of the supply or take-up reel.

FIG. 1b is a block diagram of an implementation of the rotation period counter 44 and revolution counter 46 in accordance with principles of the invention. At the beginning of a measurement the microprocessor 40 sends a reset command on line 47 to rotation period counter 44 consisting of clock counter 45 and pulse counter 49. A separate reset command is sent on line 49 to revolution counter 46. Then the number of reflective lines 50 passing by reflected light photo optical detector 48 are counted by pulse counter 49. The clock counter 45 starts counting clock pulses when the pulse counter 49 starts to count and stops counting clock pulses, when the pulse counter 49 has counted an integral number of pulses, for example 16 pulses, from optical detector 48. The clock rate of clock 42 is high compared to the rate of pulses from optical detector 48. To measure the single rotational period of a reel the microprocessor reads the clock counter 45 and the pulse counter 49 simultaneously. This can be done after one entire rotation, a few rotations, or even a fraction of a rotation as long as the fraction represents an integral number of pulses from optical detector 48 which ensures that clock counter 45 is counting clocks for an integral number of pulses for example, 16 pulses and not 16.5 pulses. The microprocessor calculates the rotation period by dividing the value read from clock counter 45 by the value from pulse counter 49 and then dividing by the number of reflective lines 50 around the reel and dividing by the clock rate of clock 42. Each rotation of the reel the revolution counter 46 increments by one. The microprocessor calculates the number of revolutions by simply reading the revolution counter, which counts the number of reflective lines 50 passing by reflected light photo optical detector 48 and dividing by the number of reflective lines 50 around the reel.

As shown in FIG. 1a, a user interfaces with the single reel rotational period addressing system 10 through three mechanisms: the remote controls 60, the manual controls 62, and the display 64 which can be a television monitor. The remote controls 60 and the manual controls 62 can include the normal controls that are in the conventional art for controlling a video cassette recorder. The remote controls 60 and the manual controls 62 in conjunction with the display 64 can be used to provide a user interface that allows a user to address a program on the magnetic tape cassette 12. This can be done by storing a directory to the programs on the magnetic tape cassette 12 either in directory memory 66 or directly on the magnetic tape 34. The directory can be retrieved by controller 40 and displayed on a television monitor.

FIG. 1c is an illustration of a display of a directory on a television screen, such as display 64, in accordance with principles of the invention. The user moves a cursor or enters a number corresponding to a program to access a particular program on the tape. For example, in FIG. 1c *MURPHY BROWN* is shown highlighted, because a cursor has been placed on that entry in the index. The user can also enter the number 3 to access *MURPHY BROWN*. After selecting a program, the user presses a control button on the remote controls 60 or the manual controls 62 to command the VCR to transport the tape to the address of the start of the selected program. Details for accessing a program are described below in relation to FIGS. 12a–12d.

FIGS. 2a through 2d show the amount of tape on each reel of a video cassette tape 12 at various stages of the winding or unwinding of the video cassette tape 12. FIG. 2a is an illustrative diagram showing the amount of tape on each reel of a video cassette tape at the start of a recording session. In FIG. 2a are shown the radius of the supply reel hub 70, the radius of tape on the supply reel at start of program recording 74, the single period of rotation (Tp) of the supply reel 78, and the single period of previous rotation (Tp+dT) of supply reel 79. The difference between the single period of rotation (Tp) of the supply reel 78 and the single period of the previous rotation (Tp+dT) of the supply reel 79 is the differential period or the change of the rotational period between one rotation and the next rotation on the supply reel 30. The differential period of rotation is related to the thickness of magnetic tape 34 and the velocity of tape travel which is normally nominally 33.34 mm per second for SP speed. The thickness of video tape is nominally 19 um for T120 tape.

Also shown in FIG. 2a are the radius of the take-up reel hub 72, the radius of tape on the take-up reel at start of program recording 76, the single period of rotation (Tp) of the take-up reel 80 and the single period of the previous rotation (Tp–dT) of take-up reel 81.

FIG. 2b illustrates the amount of tape on each reel of a video cassette tape at the end of a recording session. If the supply reel is used in conjunction with reflected light photo optical detector 48 and plurality of reflective lines 50, then the parameters of interest are the radius of the supply reel hub 70, the radius of tape on the supply reel at end of program recording 84, the single period of rotation (Tp) of the supply reel 88 and the single period of previous rotation (Tp–dT) of the supply reel 89. If the take-up reel 32 is used in conjunction with the reflected light photo optical detector 52 and the plurality of reflective lines 54, then the parameters of interest are the radius of the take-up reel hub 72, the radius of the tape on the take-up reel at the end of program recording 86, the single period of rotation (Tp) of the take-up reel 90 and the single period of the previous rotation (Tp–dT) of the take-up reel 91. As described before the differential period of rotation is the difference between the single period of rotation (Tp) of the supply reel 88 and the single period of previous rotation (Tp–dT) of the supply reel 89 or between the single period of rotation (Tp) of the take-up reel 90 and the single period of the previous rotation (Tp–dT) of the take-up reel 91, respectively.

FIG. 2c shows the amount of tape on each reel of a video cassette tape 12 when the tape is wound onto the supply reel and virtually no tape is left on the take-up reel. In this state, the radius of tape on the supply reel 94 is at a maximum and the corresponding single period of rotation Tp of the full supply reel 100 is also at a maximum. At the same time the radius of tape on the take-up reel 96 is at a minimum and is virtually identical to the radius of the take-up reel hub 72. In this state the single period of rotation To at the hub of the take-up reel 98 is at a minimum.

Finally, FIG. 2d shows the amount of tape on each reel of a video cassette tape 12 when the tape is wound almost entirely on the take-up reel. In this state, the radius of tape on the supply reel 104 is virtually identical to the radius of supply reel hub 70. The single period of rotation To at the hub of the supply reel 108 is minimal, which corresponds to a maximal rate of rotation for the supply reel. At the same time the radius of tape on the take-up reel 106 is at a maximum and the single period of rotation Tp of the full take-up reel 107 is at a maximum corresponding to a very slow rate of rotation of the take-up reel.

With the foregoing description of the apparatus of the single reel rotational period addressing system 10 and the parameters described in FIGS. 2a through 2d, the single reel rotational period method of deriving addresses on a tape will now be described.

The single reel rotational period (SRRP) method for determining the address on a tape is a random-access type of address measurement method. A video cassette tape or another type of tape that uses reels can be inserted into a recorder/player, such as a VCR, at any random point. There are three parameters in the address measurement. Two of these parameters can be very accurately measured. The third parameter, the differential period, can be measured during a recording. As a result, the method measures a recording's starting address to an accuracy typically better than 1 minute, which is superior to previous random-access measurement methods for a tape.

Consider the following notations:

v=velocity of tape travel, nominally 33.34 mm/sec for SP speed
d=thickness of video tape, nominally 19 um for T120 tape
$l_S$=length of tape from the beginning of the tape to the start of a recording
$r_0$=radius of the take-up reel hub, nominally 13 mm
$r_S$=radius at the start of a recording, at which $T_S$ is measured
$r_E$=radius at the end of a recording, at which $T_E$ is measured
$T_0$=rotational period of take-up reel at the hub, i.e. at the beginning of the tape
$T_S$=rotational period of take-up reel at the start of a recording
$T_E$=rotational period of take-up reel at the end of a recording
$N_{SE}$=number of revolutions of the take-up reel between the start and end of a recording
$N_{OS}$=number of revolutions of the take-up reel between the beginning of the tape and the start of a recording
dT=differential period, change of rotational period between one period and the next
t=time from the beginning of a tape to the start of a recording, which is the address definition in this method The single reel rotational period (SRRP) method assumes the following measurement scenario. A tape is inserted into a recorder player, such as a VCR, possibly in the middle of the tape and the address time from the beginning of the tape is not known. The rotational period of the first revolution $T_S$ is measured using the rotation period counter 44, the reflected light photo optical detector 48 and the plurality of reflective lines 50 for the supply reel, or the reflected light photo optical detector 52, and plurality of reflective lines 54 for the take-up reel. Also, the pulses sent from motor control and sensor 20 can be counted. The number of revolutions between the start and end of the recording, $N_{SE}$, is measured by using revolution counter 46. At the end of the recording, the rotational period of the last revolution $T_E$ is measured in the same manner that $T_S$ is measured.

The average differential period, which is the increase in rotational period per revolution, is then derived as $$dT=(T_E-T_S)/N_{SE} \qquad (1)$$

Assuming constant thickness of the tape and constant tape velocity, the number of revolutions from the beginning of the tape to the start of the recording is then:

$$N_{OS}=(T_S-T_0)/dT.$$

The address in time from the beginning of the tape to the start of the program is then derived by summing the revolution periods:

$$t=T_0+(T_0+dT)+(T_0+2\ dT)+\ldots(T_0+N_{OS}\ dT)$$

This becomes:

$$t=((T_S^2-T_0^2)/(2\ dT))+(T_S+T_0)/2$$

Since To is about 2.489 seconds and Ts ranges from 2.489 seconds to about 7.597 seconds, the second term is at most 5 seconds and can be dropped, so the equation becomes:

$$t=(T_S^2-T_0^2)/(2\ dT). \qquad (2)$$

Equations (1) and (2) are the two central equations used in the single reel rotational period (SRRP) address measurement method.

Another equation, easily derived, relates the tape thickness d to the differential period dT:

$$dT=2\ \pi\ d/v. \qquad (3)$$

From equation (2), the accuracy of determining t depends on the three parameters: $T_S$, $T_0$ and dT. It is important to realize that each parameter may contribute to an error in deriving t in three ways: how accurate that parameter can be measured or known, the variability of that parameter due to other factors, and the variability of the parameter due to time. Each of these parameters are examined below.

The variable $T_0$ is calculated by $2\ \pi\ r_0/v$. It is important to realize that the variability of $r_0$ and v for different cassettes or VCR is not relevant. Rather, what is relevant is the variability of $r_O$ of the same cassette in time and the variability of v for the same VCR over time. The variability of $r_O$ will mainly be due to temperature and should be extremely small. Since the VCR in PLAY or RECORD mode has highly regulated speed, v's variability should also be extremely small. In short, the variability of $T_O$ is very small. Furthermore, considering equation (2), large absolute (i.e. not percentage) error of t occurs when $T_S$ is large, e.g. around 7.5 seconds. In this case, $T_O^2$ is about 10% of $T_S^2$. Thus the contribution of error from $T_O$'s variability is insignificant. In fact, $T_O$ need not be measured. The nominal value of 2.4887 second can be used in all calculations. Measurements indicate that deviations of actual $T_O$ from this is less than 1.3%, creating a constant offset error of at most 10 seconds in a T120 tape at SP speed.

For a given $r_S$, $T_S$ only depends on v. If v is assumed to have little variability, then $T_S$ will also have little variability. The only error will be due to the accuracy with which $T_S$ can be measured. If the VCR can measure time in milliseconds accurately, then $T_S$ will have an accuracy of 1/2500 to 1/7500. Together with the accuracy as described above for $T_O$, it means that the error contribution from the numerator in equation (2) is less than 0.04%.

The parameter dT, in a sense, measures the average thickness between the $r_S$ and $r_E$. What is really needed in equation 2 is the average value of dT between $r_O$ and $r_S$. The major source of error for equation (2) in fact comes from the assumption that the mean dT between $r_S$ and $r_E$ is the same as the mean dT between $r_O$ and $r_S$.

A typical VCR tape may have accumulated tape on the take-up spool in alternate regions of PLAY and FAST FORWARD. Studies on the variability of dT in the PLAY and FAST FORWARD regions have been performed, using a FUJI AG120 tape in an RCAVR520 VCR. The results indicate that dT has a standard deviation of only about 0.25% between 4 different PLAY regions. However, the dT of the FAST FORWARD regions is on the average 1.57% higher than the mean of dT of the PLAY regions. These values can be used to estimate the errors incurred in the following example. Suppose a tape is inserted into the VCR at roughly the 1.5 hour point and the tape between $r_O$ and $r_S$ is accumulated ⅓ in PLAY mode and ⅔ in FAST FORWARD mode. Using the PLAY MODE dT to estimate the start time will thus overestimate by 1.57×⅔% =1.05%, or roughly 0.94 minute.

So far, we have centered on using the take-up reel for measurement. The supply reel can also be used and in fact may be superior to the take-up reel for two reasons. First, the supply reel accumulates tape mostly at one single speed, the REWIND mode, and therefore the tension at which the tape is accumulated on the reel is fairly constant. In contrast the take-up reel accumulates tape at both PLAY speed and the FAST FORWARD speed. As a result the dT for the supply reel does not display as large a difference as the take-up reel. In fact, studies show that the error incurred for the supply reel is typically ⅓ that of the take-up reel. Second, for a blank tape, the initial $T_S$ can be used to determine the length of the tape, i.e. the user does not need to enter the length of the tape as part of the tape initialization process.

The discussion above is about the variability of dT as a result of tape accumulation in PLAY mode or FAST FORWARD or REWIND modes. Next is a discussion about the accuracy with which dT can be measured. For each revolution, dT is about 3.5 msec. If a recording occurs over 40 revolutions (about 5 minutes of recording on the supply reel around the beginning of the tape), total change in period is about 140 msec. If $T_S$ and $T_E$ are each measured over one revolution and if the measurement accuracy of the VCR is 1 millisecond, then the two measurements taken (one for $T_S$ and one for $T_E$) will contribute an error of about 1.41 milliseconds, or 1%. This error will be in addition to that introduced by the variability of dT. This measurement error can be reduced if $T_S$ and $T_E$ are each measured as an average over several revolutions instead of one.

Based on the above discussions, the conclusions are: $T_O$ can be assumed to be 2.4887 second and does not have to be measured; if a tape machine, such as a VCR, has a clock accuracy of about 1 millisecond, then $T_S$ and $T_E$ should be measured over several or more turns to improve on the measurement accuracy of dT; the first and last turn of a recording should not be used as speed may not be constant yet; the supply reel is preferred over the take-up reel because it produces less error; if a tape is inserted into the VCR and its current position needs to be found out instantly (for search and play purpose), the VCR can make one single turn to find out $T_S$; and if an average value of dT of the tape is stored, this will allow calculation of the current position to better than 1.5% accuracy.

The method of the present invention was tested for accuracy using a FUJI AG 120 tape. A video camera was used to record the time displayed on a digital watch at SP speed over the whole tape. The tape was then played back on a RCA VR520 VCR and a picture of the digital watch was displayed on a TV, providing a reference, or absolute address, in seconds resolution, of the location on the tape. The VCR provided 8 output pulses per revolution from motor control and sensor 20 for both the supply reel and the take-up reel. These pulses were fed as interrupts to a computer for timing the completion of each revolution of each reel. The number of turns on each reel and the corresponding times were recorded into 2 files, one for the supply reel and one for the take-up reel. FIG. 14 is a flow diagram of the method used for testing the accuracy of the technique for locating a position in time along a tape. In step 600 a camera is used to record a time displayed on a digital clock along a tape. In step 602 the tape is rewound and played and in step 603 the recorded time is displayed on a television. Then in step 606 the position in time along a tape is measured using some technique and in step 608 the measured position in time is compared with the displayed recorded time.

The tape was played for roughly 15 minutes. During this period, roughly at 2.5 minute intervals, the revolution number was read from the computer screen and the digital watch time was read from the TV screen. After playing for 15 minutes, the VCR was fast forwarded to a position of roughly 40 minutes on the tape and played for 5 minutes. The revolution number and digital time were noted down once at the beginning and once at the end of this period. The VCR was again fast forwarded to roughly 60 minutes on the tape and played for 5 minutes and the procedure repeated. The VCR was then fast forwarded to roughly 110 minutes on the tape. The procedure of noting down the revolution number and the digital time was repeated 4 times until close to the end of the tape. Finally, at the end of the tape, the digital time was noted. The data and analysis are presented as follows for the take-up reel.

| N | $T_S$ (sec) | dT (usec) | Time (sec) video | Time (sec) calculated | Delta (sec) |
|---|---|---|---|---|---|
| 58 | 2.65612 | | 143 | 145.0 | 2.0 |
| | | 3490 | | | |
| 102 | 2.80970 | | 264 | 264.9 | 0.9 |
| | | 3491 | | | |
| 162 | 3.01916 | | 439 | 439.3 | 0.3 |
| | | 3507 | | | |
| 196 | 3.13840 | | 543 | 544.2 | 1.2 |
| | | 3505 | | | |
| 250 | 3.32768 | | 717 | 719.0 | 2.0 |
| | | 3487 | | | |
| 296 | 3.48808 | | 874 | 875.1 | 1.1 |
| FAST FORWARD | | 3537 | | | |
| 692 | 4.88858 | | 2539 | 2550.7 | 11.7 |
| | | 3502 | | | |
| 750 | 5.09172 | | 2829 | 2840.3 | 11.3 |
| FAST FORWARD | | 3559 | | | |
| 910 | 5.66118 | | 3694 | 3714.8 | 20.8 |
| | | 3508 | | | |
| 964 | 5.85062 | | 4004 | 4026.3 | 22.3 |
| FAST FORWARD | | 3569 | | | |
| 1368 | 7.29258 | | 6687 | 6733.1 | 46.1 |
| | | 3503 | | | |
| 1404 | 7.41870 | | 6952 | 6998.1 | 46.1 |
| | | 3492 | | | |
| 1422 | 7.48124 | | 7086 | 7131.1 | 45.1 |
| | | 3514 | | | |
| 1436 | 7.53044 | | 7191 | 7236.7 | 45.7 |

LENGTH OF TAPE: 7368 seconds $T_0$: 2.4575 seconds $T_S$ is measured as an average of the revolution periods of 5 revolutions. dT is computed simply as the difference between $T_S$ on adjacent rows divided by the difference in N. For example, the dT between row 1 and 2, 3490 usec., is simply (2.8097−2.65612)/(102−58).

For the four different PLAY regions, dT has a value of 3500.8+−9.3 usec., which is highly constant. It can be seen that the delta between calculated time and real time is about 1 second within the first 15 minutes PLAY region. The delta jumps to about 11 seconds in the second PLAY region, jumps to about 21 seconds in the third PLAY region, and then jumps to about 46 seconds in the last PLAY region. Within each region, the delta is remarkably constant, to within 1 second. The jumps in the delta can be explained in terms of the increased value of dT in the FAST FORWARD regions between the PLAY regions.

The data and analysis are presented as follows for the supply reel.

SUPPLY REEL

| N | $T_S$ (sec) | dT (usec) | Time (sec) video | Time (sec) calculated | Delta (sec) |
|---|---|---|---|---|---|
| 26 | 7.51924 | | 7172 | 7189.6 | 17.6 |
| | | 3506 | | | |
| 40 | 7.47016 | | 7067 | 7084.8 | 17.8 |
| | | 3479 | | | |
| 64 | 7.38666 | | 6889 | 6908.2 | 19.2 |
| | | 3503 | | | |
| 78 | 7.33762 | | 6786 | 6805.4 | 19.4 |
| | | 3519 | | | |
| 102 | 7.25316 | | 6611 | 6630.0 | 19.0 |
| | | 3530 | | | |
| 124 | 7.17550 | | 6453 | 6470.5 | 17.5 |
| FAST FORWARD | | 3501 | | | |
| 371 | 6.31084 | | 4795 | 4810.3 | 15.3 |
| | | 3516 | | | |
| 420 | 6.13854 | | 4490 | 4504.9 | 14.9 |
| FAST FORWARD | | 3502 | | | |
| 569 | 5.61670 | | 3619 | 3631.6 | 12.6 |
| | | 3517 | | | |
| 623 | 5.42676 | | 3321 | 3332.9 | 11.9 |
| FAST FORWARD | | 3588 | | | |
| 1228 | 3.25628 | | 647 | 649.8 | 2.8 |
| | | 3519 | | | |
| 1320 | 2.93252 | | 362 | 354.5 | 2.5 |
| | | 3510 | | | |
| 1366 | 2.77106 | | 231 | 233.4 | 2.4 |
| | | 3521 | | | |
| 1398 | 2.65838 | | 131 | 146.3 | 15.0 |

$T_0 = 2.4575$ seconds

For the four PLAY regions, dT has a value of 3512+−14.0 usec., which is highly constant. Within each PLAY region, the delta between calculated time and the real time is almost constant. The deltas between calculated time and real time ranges from about 2 seconds to about 19 seconds, which is better than the deltas in the take-up reel.

FIG. 3 is a flow chart showing the steps employed in determining the start and end address of a program recorded on a tape. The addresses are in time from the beginning of a tape.

In the method of FIG. 3 the start address from the beginning of the tape and the end address of the recording from the beginning of the tape are both determined during the time that the recording session is occurring. This allows the user to insert a tape into the VCR without regard to whether or not the tape is rewound. In step 110 the user inserts the tape into the VCR. In step 112 the user starts the recording session. The reflected light photo optical detector 52, plurality of reflective lines 54 and rotation period counter 44 are used to measure the rotational period of the take-up reel near the start of the recording in step 114. As explained above, pulses from motor control and sensor 20 can also be counted. The rotational period or the single period of rotation of a reel is the amount of time required for the reel to rotate by 360 degrees. For improved accuracy the rotational period of the take-up reel can be measured by averaging a number of take-up reel rotational periods near the start of the recording. In step 116 the number of revolutions of the take-up reel between the start and end of the recording are measured by using revolution counter 46. Near the end of the recording the rotational period of the take-up reel is measured in step 118. Again, for accuracy, the rotational period can be measured by averaging a number of rotational periods near the end of the recording. Then in step 120 the differential period is calculated in the manner indicated equation (1), above, which calculates an average differential period. A predetermined single rotational period of the take-up reel where the radius of the tape on the take-up reel is approximately the same as the radius of the take-up reel hub is accessed from storage in step 122. Then in step 124 the address in time from the beginning of the tape to the start of recording is calculated, according to equation (2), above. In step 126 the time from the beginning of the tape to the end of the recording can be calculated in the same manner as the time from the beginning of the tape to the start of the recording by using equation (2) except that the rotational period of the take-up reel near the end of the recording is used instead of the rotational period of the take-up reel near the start of the recording.

FIG. 4 is a flow chart showing the steps employed in determining the start and end address of a program recorded on a tape in time from beginning of a tape by measuring the rotational period of the supply reel in accordance with the principles of the invention.

The method of FIG. 4 determines the start address from the beginning of the tape and the end address of the recording from the beginning during the time that the recording session is occurring. This allows the user to insert a tape into the VCR without regard to whether or not the tape is rewound. In step 130 the user inserts the tape into the VCR. In step 132 the user starts the recording session. The reflected light photo optical detector 48, plurality of reflective lines 50 and rotation period counter 44 or other techniques described above are used to measure the rotational period of the supply reel near the start of the recording in step 134. In step 136 the number of revolutions of the supply reel between the start and end of the recording are measured by using revolution counter 46. Near the end of the recording the rotational period of the supply reel is measured in step 138. Then in step 140 the differential period is calculated in the manner indicated equation (1), above. A predetermined single rotational period of the supply reel where the radius of the tape on the supply reel is approximately the same as the radius of the supply reel hub is accessed from storage in step 142. Then in step 144 the address in time to the end of the tape from the start of recording is calculated, according to equation (2), above. In step 145 the address in time from the beginning of the tape (defined as when the entire tape is on the supply reel) to the start of the recording is calculated by subtracting from L (the total length of tape) the time from the start of recording to the end of the tape. In step 146 the time to the end of the tape from the end of the recording can be calculated in the same manner as the time to the end of the tape to the start of the recording by using equation (2) except that the rotational period of the supply reel near the end of the recording is used instead of the rotational period of the supply reel near the start of the recording. In step 147 a subtraction is performed to calculate the time from the beginning of the tape to the end of recording.

Figure 5A:
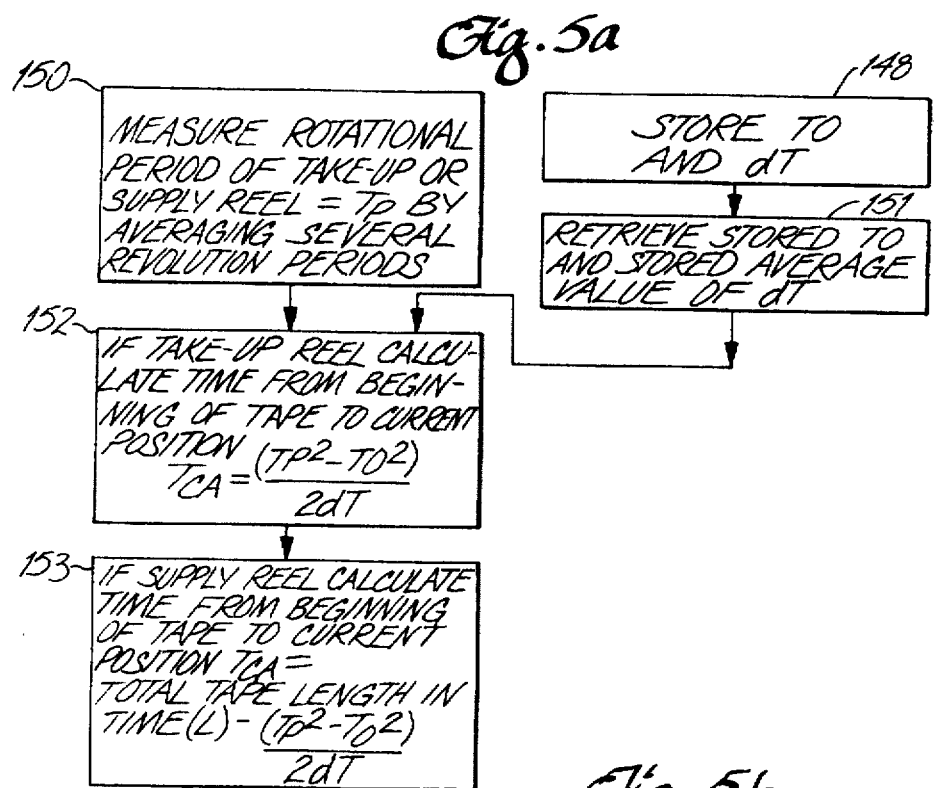
FIG. 5a is a flowchart showing the steps employed in determining the current address in time from the beginning of a tape on a reel in accordance with principles of the invention.

FIG. 5a is a flowchart showing the steps employed in determining the current address in time from the beginning of a tape on a reel in accordance with the principles of the invention. In some situations it may be useful to know the current address in time on a tape even though a program is not being recorded on the tape. To accomplish this the rotational period of one single turn of either the take-up reel or the supply reel is measured in step 150. For accuracy the measurement is performed by averaging the periods of several rotations. In step 151 a predetermined single rotational period of a reel when the radius of the tape on a reel is approximately the same as the radius of the reel hub is accessed from storage. Also in step 151 a predetermined differential period between one rotational period of the reel and the next rotational period of the reel as the tape is wound around or unwound from the reel is accessed from storage.

The single rotational period of the reel when the radius of the tape on the reel is approximately the same as the radius of the reel hub and the average differential period can be measured or assumed to be a value and stored once, as shown in step 148. The single rotational period of the reel when the radius of the tape on the reel is approximately the same as the radius of the reel hub is fairly constant for a particular type of cassette, such as a video cassette tape. The differential period between one rotational period of the reel and the next rotational period of the reel is not a constant over the entire span as the tape is wound or unwound from the reel; however, the differential period has a relatively low variance and an average differential period is sufficient. The differential period can be determined as shown in equation (3) or be derived as shown in FIGS. 3 or 4.

The address in time from the beginning of the tape is derived in step 152, which calculates the time from the beginning of the tape to the current position on the tape according to equation (2), described above. Step 152 is used when the take-up reel is used. When the supply reel is used, then step 153 is used to calculate the time from the beginning of the tape (defined as when the entire tape is on the supply reel) to the current tape address.

Figure 5B:
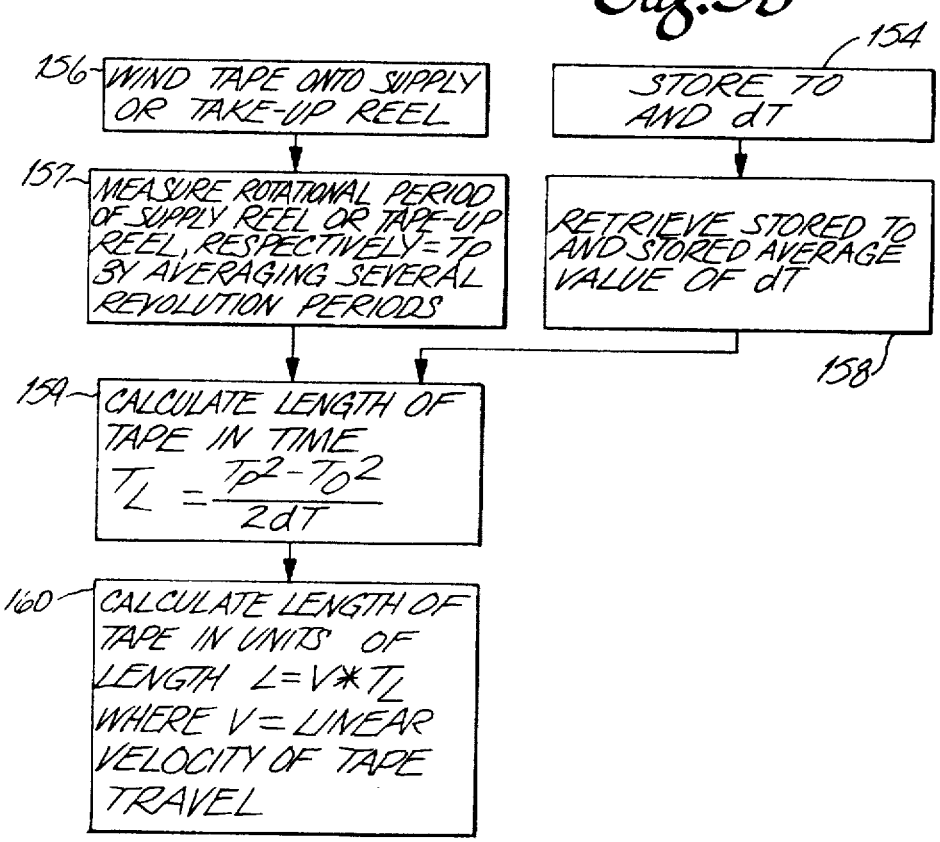
FIG. 5b is a flowchart showing the steps employed in determining the amount of tape in time and length on a reel in accordance with principles of the invention.

For some applications, it is necessary to measure the total length of tape that is in a video tape cassette or to know the time from the beginning of the tape to the end of the tape. One application is to derive the total length of the tape (L) that is used as a parameter in step 153 in FIG. 5a. FIG. 5b is a flowchart showing the steps employed in determining the amount of tape in time and length on a reel. In step 156 the tape is wound entirely onto either the supply or the take-up reel. Then, the rotational period of either the supply reel or the take-up reel, respectively is measured in step 157. For accuracy the measurement can be the average of several rotational periods. In step 158 a predetermined differential period between one rotational period of the reel and the next rotational period of the reel is accessed from storage. Again, this predetermined differential period can be an average of the differential periods over the span of winding or unwinding a tape from a reel. Also in step 158 a predetermined single rotational period of either the supply reel or the take-up reel, respectively, when the radius of the tape on the respective reel is approximately the same as the radius of the reel hub is accessed from storage. The predetermined single rotational period of the reel when the radius of the tape on the reel is approximately the same as the radius of the reel hub and the average differential period can be measured or assumed to be a value and stored once, as shown in step 154. In step 159 the length in time from the beginning of the tape to the end of the tape is calculated in the manner indicated in equation (2) described above. In step 154 the length of tape in units of length from the beginning of the tape to the end of the tape can be calculated by multiplying the linear velocity of the tape with the time between the beginning of the tape and the end of the tape as calculated in step 159.

FIGS. 6a, 6b and 6c illustrate the layout of information on a tape for home recorded (HR) tapes, pre-recorded (PR) tapes, and retroactively indexed (RI) tapes. Each of these tape layouts and the method for indexing the tapes will now be described in turn.

FIG. 6a is a schematic view of an embodiment for home recorded tapes illustrating storing VISS marks on a control track and TPA packets each containing a tape identification number, program number, and absolute address on a vertical blanking interval line and using a directory memory in accordance with the principles of the invention. In the case of home recorded (HR) tapes the VISS marks 180, 182, and 184 are placed on control track 166 at the start of each program on the tape 34. On VBI line 19, which is one of the VBI lines on a normal television frame and is designated in FIG. 6a as 167, TPA packets can be written. The information in a TPA packet is shown in FIG. 9 and includes the tape identification 214, the program number 216 and the absolute address 218. The tape identification is a number that identifies the video cassette tape being used. The program number relates to the number of the program that is recorded on the tape adjacent to the TPA packet. In FIG. 6a TP3A indicates a TPA packet for program number 3. For example, the program *MURPHY BROWN*, shown in FIG. 1c is program number 3. The absolute address in the TPA packet is an indication of the time from the beginning of the tape to the location on the tape at which the particular TPA packet is written. Since the TPA is written in VBI lines across the tape, the absolute address varies across the tape.

The foregoing description applies to analog VCR tapes. For digital video tapes the same techniques can be applied except that an index block is part of each track and can be used instead of vertical blanking interval lines for storing the TPA packets.

The directory memory 66 which is coupled to microprocessor 40, as shown in FIG. 1a contains a directory 160, as shown in FIG. 6a. The directory information is shown in FIG. 7, and contains a D(0) portion, which contains certain parameters, and D(1) to D(N) portions, which are directory entries for each program. The D(0) portion of the directory 161 is shown in more detail in FIG. 8a. As shown in FIG. 8a, a previously measured and stored predetermined single rotational period of the reel when the radius of the tape on the reel is approximately the same radius of the reel hub can be stored in location 200. In location 202 of D(0) a predetermined differential period between one rotational period of the reel and the next rotational period of the reel as a recording tape is wound around or unwound from a reel can be stored. The predetermined differential period is an average and can be derived according to equation (3) above, or calculated as shown in step 120 of FIG. 3 or step 140 of FIG. 4.

Each entry D(1) 162 and D(2) 163 to D(N) 164 is used to store information about a program stored on the recording tape as shown in FIG. 8b. For example, the program number 206, the start address 208, the end address 210 and the record speed for that program 212 can be stored in the directory.

Figure 10:
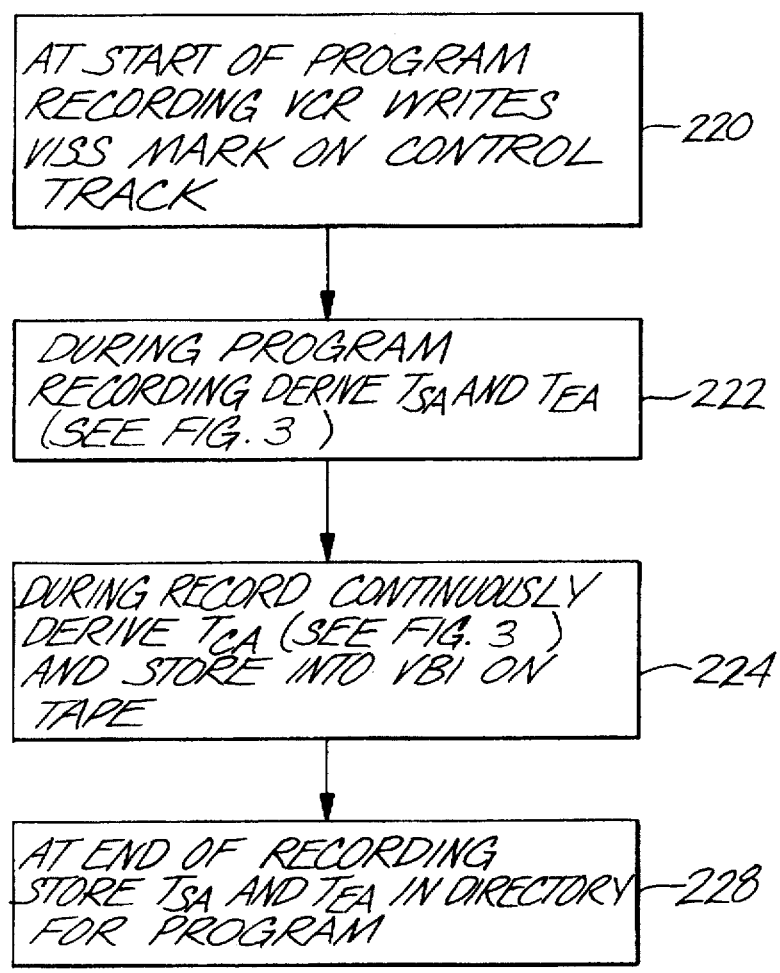
FIG. 10 is a flowchart showing the steps employed in using the steps of FIG. 3 or 4 during the recording of a home recorded tape in accordance with principles of the invention.

FIG. 10 is a flowchart showing the steps employed during the recording of a home recorded tape in accordance with the principles of this invention. The VISS marks 180, 182, and 184 are placed automatically by the VCR at the start of a program recording. In step 222 the start address of the beginning of the program and the end address of the end of the program can be determined using the method described in FIG. 5a.

In addition, while the program is being recorded the steps described in FIG. 5a can be used to continuously derive the address in time of the current position of a tape from the beginning of the tape. In step 224, the derived current address can be stored onto the VBI line 19 of the tape as part of the TPA packet on the tape; for example, the derived current address can be stored in location 218 of the TPA packet format as shown in FIG. 9.

At the end of the recording, the start and end addresses for the program are stored in the directory in step 228. For example, if program 2, as shown in FIG. 6a is being recorded, then the start address and the end address of the program on the tape is stored into location 208 and 210, respectively of D(2) 163 in the directory. The combination of VISS marks TPA information and the information stored in the directory can be used later to access the program from the home recorded tape. This is described in further detail below in the description of FIG. 12.

FIG. 6b is a schematic of an embodiment for pre-recorded (PR) tapes illustrating storing VISS marks on a control track, storing TPA packets each containing a tape identification number, program number, and absolute address on a vertical blanking interval, and storing a directory in the vertical blanking interval lines in accordance with the principles of the invention. In FIG. 6b VISS marks 186, 188 and 190 are again placed in the control track 166 at the start of the programs. This can be done at the time the pre-recorded tape is produced or copied from a master tape. On a pre-recorded tape the TPA packets 176 are previously stored onto the tape on vertical blanking interval line 19 which is designated as 167 in FIG. 6b. In the case of pre-recorded tapes the TPA packets will already contain the appropriate tape identification number, program number and absolute address which, of course, will change over the length of the tape. The directory 178 has the same information as directory 160 and is previously stored onto the tape in vertical blanking interval line 20 which is designated as 168 in FIG. 6b. This is a key difference between home recorded and pre-recorded tapes. In a home recorded tape the directory is stored in directory memory 160. In a pre-recorded tape the directory is stored on the tape in the VBI lines. For a digital VCR tape the TPA packets and directory are stored in an index block for each track rather than the VBI lines.

The directory 178 has the same information as described before in FIG. 7 and has a D(0) entry and D(1) to D(N) entries for each program recorded on the pre-recorded tape. The directory may be stored in one VBI line 20 or in multiple VBI lines, as required, and is repeated along the tape length.

The method of using the steps of FIG. 5a for accessing a program on a pre-recorded tape will be described below in connection with the description of FIG. 12.

FIG. 6c is a schematic view and embodiment for retroactively indexed (RI) tapes illustrating storing VISS marks on a control track and using a directory memory in accordance with the principles of the invention. As shown in FIG. 6c, VISS marks 192, 194 and 196 can be placed at the start of each program. Also a directory 160 is stored in directory memory 66.

Figure 11:
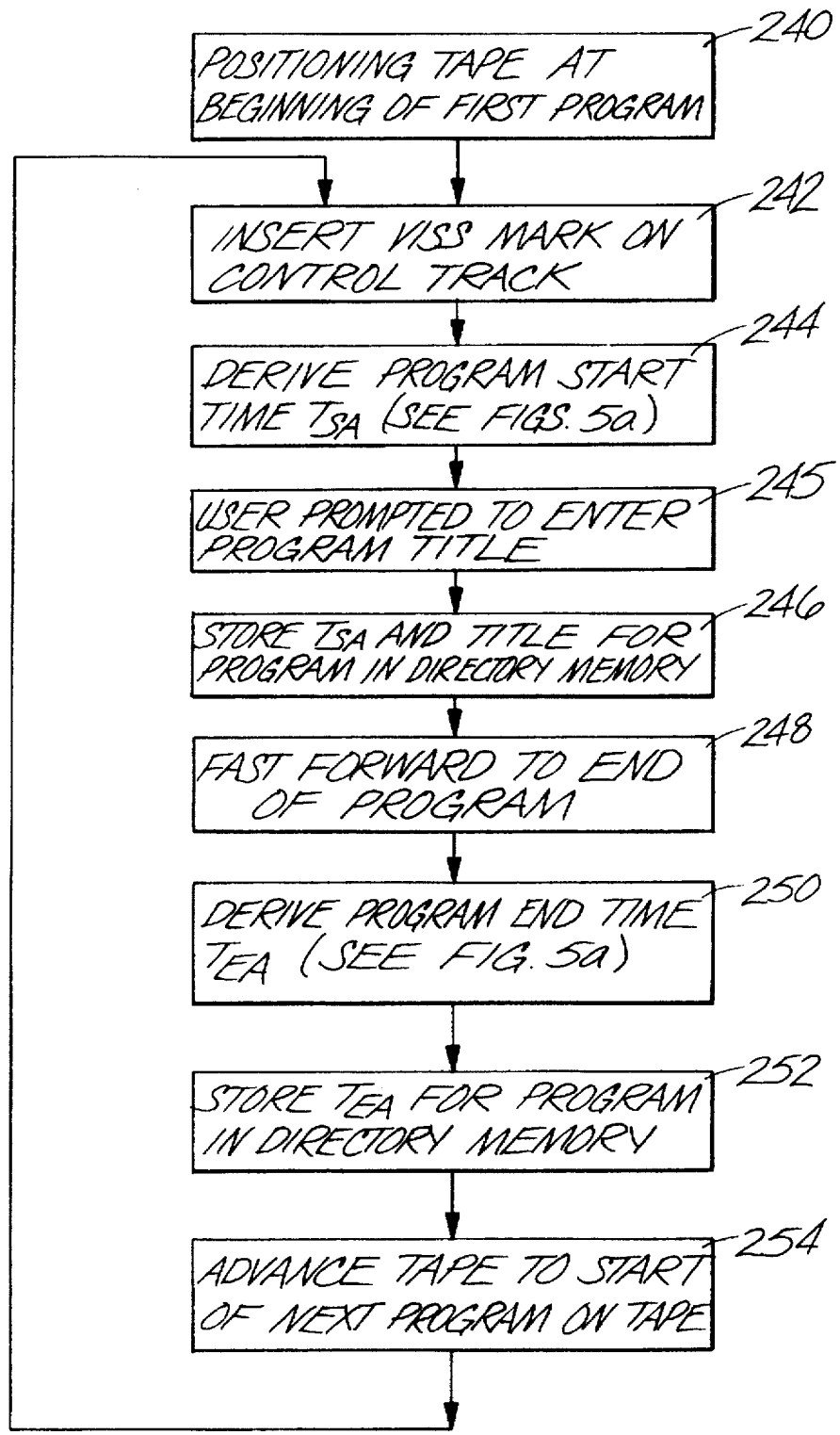
FIG. 11 is a flowchart showing the steps employed in using the steps of FIG. 3 or 4, while retroactively indexing a retroactively indexed tape in accordance with principles of the invention.

FIG. 11 is a flowchart showing the steps employed for retroactively indexing a tape in accordance with the principles of the invention. A retroactively indexed tape has programs which were recorded without any index to the programs being recorded or stored in any directory. The purpose of retroactively indexing is to create such an index so that the programs may more easily be accessed. In step 240 the user uses remote controls 60 or manual controls 62 to position the tape at the beginning of the first program to be indexed. The user then inserts a VISS mark on the control track 166 of the tape as shown in step 242. The program start address is then derived using the steps of FIG. 5a in step 244. The user is then prompted to enter the program title in step 245. In step 246 the start address and the title are stored in the directory memory 66 in the location for the program being indexed. The user can then skip to step 254 to advance the tape to the start of the next program and repeat steps 242–246. To access the program the user only needs the start address; however if the user wants to also determine and store the end address of the program, then steps 248–252 can be executed. The user uses remote controls 60 or manual controls 62 to fast forward to the end of the program as shown in step 248. Then, the steps of FIG. 5a are used to derive the program end address in time from the beginning of the tape as shown in step 250. A simplification is to use the start address of the next program as the end address of the preceding program. In step 252 the end address in time from the beginning is stored in directory memory 66 in the location for the program being indexed. In step 254 the user can advance the tape to the start of the next program on the tape using remote controls 60 or manual controls 62 and then continue with the procedure by recycling to step 242. In this manner the directory for the tape is created in directory memory 66.

Figure 12A:
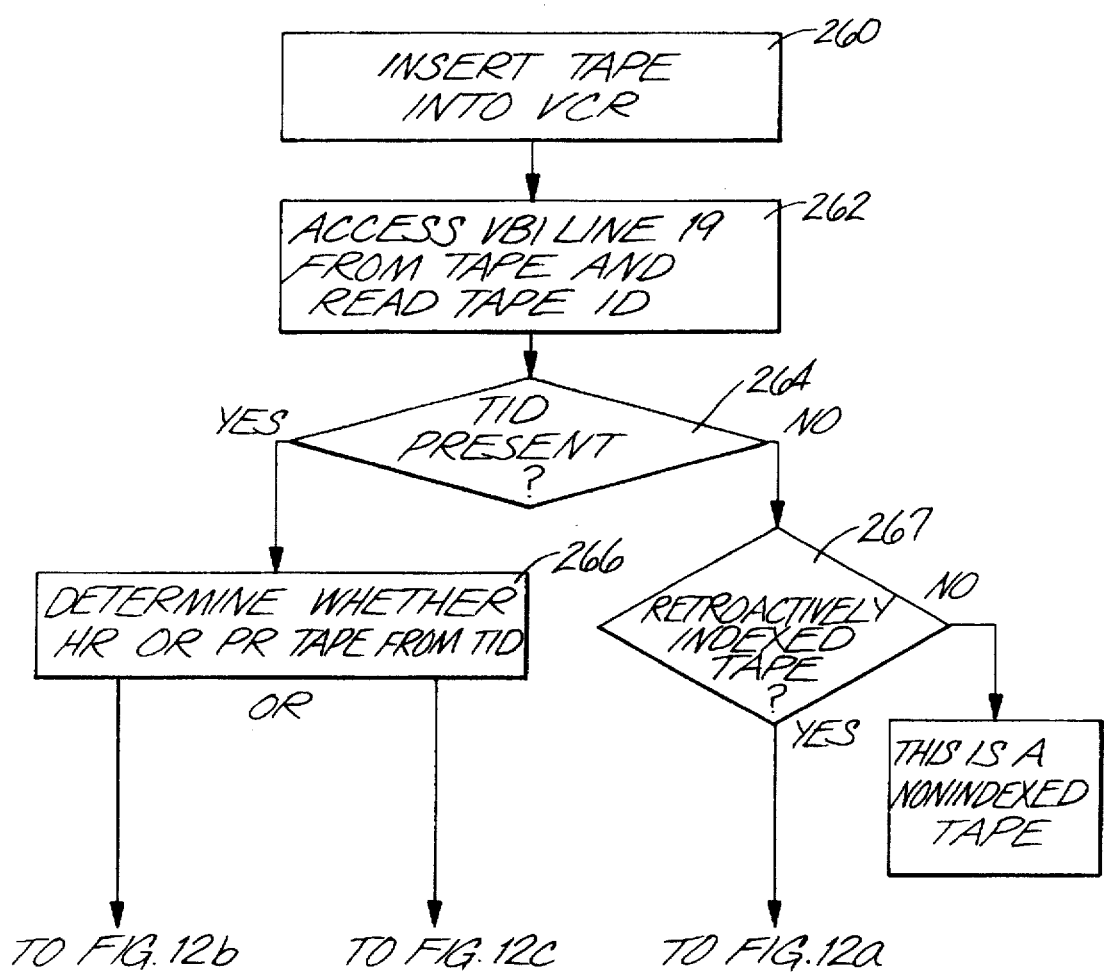

FIGS. 12a through 12d are flowcharts showing the steps employed in using the steps of FIG. 5a to assist in accessing programs recorded on a tape in accordance with the principles of the invention. FIG. 12b shows the steps employed in accessing programs recorded on a home recorded tape. FIG. 12c shows the steps employed in accessing programs recorded on a pre-recorded tape. FIG. 12d shows the steps employed in accessing programs stored on a retroactively indexed tape.

In general it is not known when inserting a tape into a VCR whether the tape is a home recorded tape a pre-recorded tape or a retroactively indexed tape. After inserting the tape into the VCR as shown in step 260, the next step is to determine which type of tape has been inserted. In step 262 the VBI line 19 is accessed and read from the tape and a tape identification number is read from the TPA packet. In step 264, it is determined whether a TPA packet with a tape identification number is present on the tape. Some searching along the tape for a TPA packet may be performed. If there is no tape identification present on the tape then in step 267 the user is prompted to respond whether this is a retroactively indexed tape. If the tape is a retroactively indexed tape, then the next steps are as shown in FIG. 12d, otherwise this is a nonindexed tape and the VCR operates in a conventional manner. If the tape identification is present then the tape identification is examined to determine whether the tape is a home recorded tape or a pre-recorded tape. Pre-recorded tapes have a unique set of tape identification numbers, which allows them to be distinguished. If the tape is a home recorded tape then the next steps are as shown on FIG. 12b. However, if the tape is a pre-recorded tape then the next steps are as shown in FIG. 12c.

Assuming the tape is a home recorded tape, then in step 280 of FIG. 12b, the tape identification is read from the tape and used to access the directory for that tape from the directory memory 66, because the directory memory can store multiple directories for multiple tapes. In step 282 the information from the directory is displayed to the user on display 64 and the user selects a program to access via the remote controls 60 or the manual controls 62. FIG. 1c shows an example display. The user can select a program by positioning a cursor or entering a number. For example, as shown in FIG. 1c, the user can use a cursor to select MURPHY BROWN or enter the number 3. In step 286 the steps of FIG. 5a are used to derive the current address in time from the beginning of the tape. In step 284, the start address ($T_{DS}$) 208 is read from directory memory 66 for the program being accessed. In step 290 the difference between the current address in time and the start address in time of the program being accessed is calculated. In step 292 if the difference in the current address and the start address is positive, then the tape is rewound for the difference in time and if the difference in time is negative then the tape is fast forwarded for the difference in time adjusted for rewind or fast forward speeds. At this point the tape should be positioned near the start of the program. The positioning of the tape can be further refined for home recorded tape by using the absolute addresses recorded as part of the TPA packets on the tape and also by using the VISS marks on the tape. Although a TPA packet may be on the home recorded tape, the absolute address (AA) part of the TPA packet is optional and may not be used. In step 294 a test is done to see whether the absolute address is part of the TPA packet. If not, then the next steps is step 300 to determine whether VISS marks are used. If the absolute addresses are part of the TPA packet, then the next step is 296 which reads the absolute address (AA) from the TPA packet and calculates the difference between the absolute address of the current position of the tape and the start address of the program as stored in the directory memory 66. This is used in step 298 to either rewind the tape or to fast forward the tape for the difference in time adjusted for rewind/fast forward speeds between the absolute address and the program start address stored in the directory. At that point, the tape is at the program start address. If VISS marks are used then in step 302 the speed is slowed down to search speed while searching for a VISS mark, because the control track can not be read at fast forward or rewind speeds. If no VISS mark is found in step 304 then a search continues to find the next VISS mark. When a VISS mark is found then program number is checked in steps 305 and 307 to determine whether the program number read from the TPA packet matches the program number selected by the user. If yes, then the tape is at the program start, otherwise the VCR will search for the next VISS mark.

If the tape is a pre-recorded tape then the steps of FIG. 12c are used. In step 320 the tape identification is used to access the proper directory for the tape from VBI line 20 designated as 167 in FIG. 6b. In step 322 the directory information is displayed to the user, as shown in FIG. 1c and the user selects a program to access on the tape. The user can do this using the remote controls 60 or the manual controls 62. Then in steps 336 and 338, the absolute address is read from the TPA packet and a difference between the program address and the absolute address on the tape is calculated and is used to either rewind or fast forward the tape to the program start which is performed in step 338. Then in step 339 the tape is slowed to search speed to search for a VISS mark in step 344 and if a VISS mark is found then the VCR slows down to play speed to read the program number from the TPA packet and check for equality with the program number selected by the user. If the program numbers match, then the tape is at the proper start address, otherwise the tape is forwarded or rewound in search speed to the next VISS mark until the current program number is found.

If the tape is a retroactively indexed tape then, because there are no TPA packets recorded on the tape, the user is prompted via display 64 to input via the remote controls 60 or the manual controls 62, the tape identification number in step 356 in FIG. 12d. The tape identification number is a number the user assigned to the tape when retroactively indexing the tape and is used in step 360 to access a directory for the tape from the directory memory 66. Then in step 362 the directory is displayed to the user on display 64, as shown in FIG. 1c and the user selects a program to access. The user can select a program via remote controls 60 or manual controls 62. The steps of FIG. 5a are then used to determine the current address of the tape and time from the beginning of the tape, in step 366. In step 364 the start address for the program to be accessed is read from the directory memory 66. In step 370 the difference between the current address in time on the tape and the start address of the program to be accessed is calculated and in step 372 the tape is either rewound or fast forwarded by the difference in time. A search is done at search speed for a VISS mark in step 382. Once a mark is found in step 384 then the tape is at the program start.

FIGS. 13a through 13d are flowcharts showing another method to access programs recorded on a tape in accordance with the principles of the invention. FIG. 13b shows the steps employed in accessing programs recorded on a home recorded tape. FIG. 13c shows the steps employed in accessing programs recorded on a pre-recorded tape. FIG. 13d shows the steps employed in accessing programs stored on a retroactively indexed tape.

In the same manner as shown in FIG. 12a, in FIG. 13b it is determined whether the tape is a home recorded tape, a pre-recorded tape, or a retroactively indexed tape. The steps are the same as in FIG. 12a except that if the tape is a home recorded tape then the next steps are as shown on FIG. 13b, if the tape is a pre-recorded tape then the next steps are as shown in FIG. 13c, and finally if the tape is a retroactively indexed tape then the next steps are as shown in FIG. 13d.

Assuming the tape is a home recorded tape, then in step 280 of FIG. 13b, the tape identification is read from the tape and used to access the directory for that tape from the directory memory 66. In step 282 the information from the directory is displayed to the user on display 64 and the user selects a program to access via the remote controls 60 or the manual controls 62. FIG. 1c shows an example display. In step 284, the start address ($T_{DS}$) 208 is read from directory memory 66 for the program being accessed.

In step 486 it is determined whether the absolute address (AA) is part of a TPA packet in VBI line 19 of the tape. If the absolute address is part of the TPA packet then in step 488 the TPA packet is read from the tape VBI line to obtain the absolute address $T_{AA}$. The formula shown in step 488 of FIG. 13B is then used to calculate the single rotational period of tape at the absolute address and this is entered into the parameter $T_C$. If on this tape the absolute address is not part of the TPA packet then the single rotational period of the current address is measured in step 490 by averaging several turns. Then in step 494 the start address $T_{DS}$ is used in the equation shown in step 494 of FIG. 13b to calculate the rotational period of the tape at the start address. Then in step 496 the number of turns between the start address of the program being accessed and the current address is calculated according to the formula shown in step 496. The in step 498, if N is greater than zero, then the tape is fast forwarded by slightly less than N turns, or if N is equal or less than zero, then the tape is rewound by slightly more than the absolute value of N turns. At this point the tape should be positioned just before the program to be accessed. In step 500 the tape is slowed down to search speed and a search is performed for a VISS mark in the control track. In step 502 if a VISS mark is found then in step 504 the tape is slowed down to play speed and the TPA packet in the VBI line 19 is accessed and the program number is checked to determine whether it is the proper program number corresponding to the program being accessed. If it is the proper program number as determined in step 506, then the program start address has be arrived at as shown in step 508. If the program number is not the correct program number then in step 510 if the program number is greater than the desired program number then the tape is rewound a short distance. On the other hand, if the program number is less than the desired program number than the tape is fast forwarded for a short distance. Then step 500 is repeated and the tape is slowed down to search speed to search for a VISS mark in the control track. Once a VISS mark is found then steps 504 and 506 are repeated and if necessary steps 510 and 500 are again repeated. Eventually, in this method the program start address on the tape is arrived at and the program can be played.

FIG. 13c shows the steps employed in accessing programs recorded on a pre-recorded tape. FIG. 13c is very similar to the method for accessing a program on a home recorded tape shown in FIG. 13b. The primary difference is that in FIG. 13c steps 486 and 490 of FIG. 13b have been eliminated. The reason for this is that for a pre-recorded tape it is known that the absolute address is part of the TPA packet so step 488 is performed and the result used in step 496 to determine the number of turns of the reel to access the start address of the program. The remaining steps in FIG. 13c are the same as the corresponding steps in FIG. 13b.

FIG. 13d shows the steps employed in accessing programs recorded on a retroactively indexed tape. In the case of a retroactively indexed tape, absolute addresses are not recorded in the VBI lines of the tape. Therefore steps 486 and 488 of FIG. 13b are eliminated in the case of FIG. 13d. In step 490 the rotational period $T_C$ of the current address is measured by averaging several turns of the reel. The result of the rotational period measurement is then used in step 496 to calculate the number of turns of the reel necessary to advance or rewind to the start address of the desired program. The remaining steps shown in FIG. 13d are similar to the corresponding steps in FIG. 13b except that steps 504 and 510 are slightly modified, because a TPA packet with a program number is not present on a retroactively indexed tape. Thus, instead of searching for the correct program number, the user searches for the correct program itself.

Thus, apparatus and methods have been described for an addressing system that provides fast and accurate access to the start and/or end of programs stored on a magnetic tape. Apparatus and methods have also been described for determining the current position on a magnetic tape. This is accomplished at a much lower cost than provided by random access media using movable heads or semiconductor memory. The described embodiments of the invention are only considered to be preferred and illustrative of the inventive concept and the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed is:

1. An apparatus for measuring an address in time between a beginning of a tape on a reel and a current location along the tape wound around a hub of the reel comprising:

means for measuring a single rotational period of the reel near a first location along the tape being represented as Tp;

means for storing a single rotational period of the reel when the radius of the tape on the reel is approximately the same as the radius of the reel hub being represented as To;

means for deriving an average differential period between one rotational period of the reel and the next rotational period of the reel as the tape is wound around or unwound from the reel being represented as dT; and means for deriving from Tp, To and dT, an address in time from the beginning of the tape to the first location on the tape.

2. An apparatus for measuring a start address for a program recorded on a recording tape wound around a hub of a take-up reel as the program is recorded comprising:

means for measuring a single rotational period of the take-up reel near a start of the recording of the program being represented as Ts;

means for counting the number of revolutions of the take-up reel between the start and an end of the recording, the number of revolutions being represented as N;

means for measuring a single rotational period of the take-up reel near the end of the recording of the program being represented as Te;

means for calculating an average differential period between one rotational period of the take-up reel and the next rotational period of the take-up reel as the recording tape is wound around or unwound from the take-up reel being represented as dT by using Ts, N and Te;

means for storing a single rotational period of the reel when the radius of the tape on the reel is approximately the same us the radius of the reel hub being represented as To; and means for deriving from Ts, N, To, and To, the start address being represented by Tsa as the time between the beginning of the tape on the take-up reel and the start of recording of the program recorded along the recording tape.

3. The apparatus of claim 2, additionally comprising means for deriving from Ts, N, Te, and To, the end address of the program being represented by Tea as the time between the beginning of the tape on the take-up reel and the end of recording of the program recorded along the recording tape.

4. The apparatus of claim 3, additionally comprising means for subtracting Tsa from Tea to determine the length of the program.

5. The apparatus of claim 3, in which the means for deriving from Ts, N, Te, and To, the end address of the program being represented by Tea as the time between the beginning of the tape on the take-up reel and the end of recording of the program recorded along the recording tape additionally comprises processor means for obtaining a value Tea corresponding to $$Tea = (Te^2 - To^2)/(2 * dT).$$

6. The apparatus of claim 2, in which the means for measuring a single rotational period of the take-up reel near a start of the recording of the program being represented as Ts additionally comprises:

means for generating pulses as the take-up reel rotates;

a rotational period counter means coupled to the means for generating pulses for measuring time for a rotation of the take-up reel; and a clock coupled to the rotational period counter.

7. The apparatus of claim 6, in which the means for counting the number of revolutions of the take-up reel between the start and an end of the recording, the number of revolutions being represented as N additionally comprises a revolution counter means coupled to the means for generating pulses for counting the revolutions of the take-up reel.

8. The apparatus of claim 2, in which the means for measuring a single rotational period of the take-up reel near a start of the recording of the program being represented as Ts comprises:

a plurality of reflective lines on the take-up reel;

optical detector means for sensing the passing of the reflective lines as the take-up reel rotates;

a rotational period counter means coupled to the optical detector means for measuring a time for a rotation of the take-up reel; and a clock coupled to the rotational period counter.

9. The apparatus of claim 2, in which the means for calculating an average differential period between one rotational period of the take-up reel and the next rotational period of the take-up reel as the recording tape is wound around or unwound from the take-up reel being represented as dT by using Ts, N and Te additionally comprises process means for obtaining a value dT corresponding to $$dT = (Te - Ts)/N.$$

10. The apparatus of claim 2, in which the means for deriving from Ts, N, and To, the start address being represented by Tsa as the time between the beginning of the tape on the take-up reel and the start of recording of the program recorded along the recording tape additionally comprises processor means for obtaining a value Tsa corresponding to $$Tsa = (Ts^2 - To^2)/(2 * dT).$$

11. A method for measuring a length of a tape wound between a supply reel having a hub and a take-up reel having a hub comprising the steps of:

winding the entire length of tape onto either the supply reel or the take-up reel;

measuring a single rotational period being represented as Tp of the reel upon which the tape is wound;

storing a single rotational period of the reel when the radius of the tape on the reel is approximately the same as the radius of the reel hub being represented as To;

deriving an average differential period between one rotational period of the supply or take up reel and the next rotational period of the supply or take up reel as the tape is wound around the supply or take up reel being represented as dT; and deriving from Tp, To and dT an address in time from the beginning of the tape to the end of the tape.

12. The method of claim 11 wherein the step of deriving from Tp, To and dT an address in time from the beginning of the tape to the end of the tape comprises the step of calculating a value T1 corresponding to $$T1 = (Tp^2 - To^2)/(2 * dT).$$

* * * * *

UNITED STATES PATENT AND TRADEMARK OFFICE
CERTIFICATE OF CORRECTION

PATENT NO. : 5,724,203
DATED : March 3, 1998
INVENTOR(S) : Daniel S. Kwoh; Yee Kong Ng It is certified that error appears in the above-indentified patent and that said Letters Patent is hereby corrected as shown below:

Abstract, line 18, replace "Tc = (Tp$\hat{0}$2 – To$\hat{0}$2)/(2 * dT)"with
-- Tc = (Tp$^\wedge$2 – To$^\wedge$2)/(2 * dT) --.
Column 8, line 33, replace "FIG. 13a through 13d" with
--FIGS. 13a through 13d --.
Column 16, line 51, before "equation" insert -- in --.
Column 17, line 19, before "equation" insert -- in --.
Column 18, line 38, replace "In step 154" with -- In step 160 --.
Column 18, line 65, replace "TP3A" with -- TP$_3$A --.
Column 21, line 64, replace "next steps" with -- next step --.
Column 23, line 33, replace "The in step" with -- In step --.
Column 25, line 11, replace "Ts, N, To, and To" with -- Ts, N, Te, and To --.

Signed and Sealed this

Twenty-ninth Day of December, 1998

BRUCE LEHMAN

*Attest:*

*Attesting Officer*     Commissioner of Patents and Trademarks